US010050762B2

(12) United States Patent
Mack et al.

(10) Patent No.: US 10,050,762 B2
(45) Date of Patent: Aug. 14, 2018

(54) CHANNEL QUALITY MEASUREMENT AND TRANSMIT POWER ALLOCATION IN A DYNAMIC SPECTRUM MANAGEMENT SYSTEM

(71) Applicant: INTERDIGITAL PATENT HOLDINGS, INC., Wilmington, DE (US)

(72) Inventors: Jane Mack, Melville, NY (US); Francois Periard, Montreal (CA); Fred M. Schreider, Commack, NY (US); John Cartmell, North Massapequa, NY (US); Amith V. Chincholi, West Babylon, NY (US); Alpaslan Demir, East Meadow, NY (US); Zinan Lin, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 579 days.

(21) Appl. No.: 14/035,543

(22) Filed: Sep. 24, 2013

(65) Prior Publication Data
US 2014/0086081 A1  Mar. 27, 2014

Related U.S. Application Data

(60) Provisional application No. 61/704,766, filed on Sep. 24, 2012, provisional application No. 61/706,993, filed on Sep. 28, 2012.

(51) Int. Cl.
*H04L 5/00* (2006.01)
*H04W 16/14* (2009.01)
(Continued)

(52) U.S. Cl.
CPC .............. *H04L 5/006* (2013.01); *H04L 5/001* (2013.01); *H04W 16/14* (2013.01); *H04B 17/318* (2015.01); *H04W 52/34* (2013.01)

(58) Field of Classification Search
None
See application file for complete search history.

(56) References Cited

U.S. PATENT DOCUMENTS

| 6,839,429 B1 * | 1/2005 | Gaikwad | H04L 5/14 370/201 |
| 8,116,799 B2 * | 2/2012 | Cho | H04W 52/04 370/235 |

(Continued)

FOREIGN PATENT DOCUMENTS

| JP | 2011-160376 A | 8/2011 |
| JP | 2011-223112 A | 11/2011 |

(Continued)

OTHER PUBLICATIONS

"Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput", IEEE P802.11n /D11.0, Oct. 2009, 533 pages.

(Continued)

*Primary Examiner* — Noel R Beharry
*Assistant Examiner* — Rodrick Mak
(74) *Attorney, Agent, or Firm* — Condo Roccia Koptiw LLP

(57) ABSTRACT

A dynamic spectrum management (DSM) engine may determine the channel quality of one or more channels associated with the DSM engine when packets are not being transmitted over the channels. For example, the DSM engine may trigger a channel quality measurement on a non-primary (Continued)

channel on a condition that a predetermined period of time has lapsed since the last activity associated with the non-primary channel. Channel quality measurement may be triggered via a data sending event on the non-primary channel such as sending a data frame on the non-primary channel. The DSM engine may perform respective quality measurements on multiple channels and store the respective quality values in a database. Time-averaged channel qualities for the channels may be computed based on the stored quality values for computing transmit power distribution of across the channels.

15 Claims, 14 Drawing Sheets

(51) Int. Cl.
  *H04W 52/34* (2009.01)
  *H04B 17/318* (2015.01)

(56) References Cited

U.S. PATENT DOCUMENTS

| | | | |
|---|---|---|---|
| 9,083,568 B2 | 7/2015 | Ma et al. | |
| 2002/0060995 A1 | 5/2002 | Cervello et al. | |
| 2004/0142696 A1* | 7/2004 | Saunders | H04B 1/715 455/450 |
| 2008/0043706 A1* | 2/2008 | Reznik | H04L 1/0026 370/347 |
| 2008/0117867 A1* | 5/2008 | Yin | H04L 1/0029 370/329 |
| 2008/0194280 A1 | 8/2008 | Thurfjell et al. | |
| 2009/0207800 A1* | 8/2009 | Shan | H04W 72/00 370/329 |
| 2009/0262688 A1* | 10/2009 | Tsai | H04L 1/0002 370/329 |
| 2010/0082791 A1* | 4/2010 | Liu | H04L 12/56 709/223 |
| 2010/0105332 A1* | 4/2010 | McHenry | H04W 16/14 455/62 |
| 2010/0111023 A1 | 5/2010 | Pelletier et al. | |
| 2011/0002282 A1* | 1/2011 | Inoue | H04L 5/0037 370/329 |
| 2011/0096739 A1* | 4/2011 | Heidari | H04W 72/085 370/329 |
| 2011/0199990 A1* | 8/2011 | Chang | H04W 52/241 370/329 |
| 2012/0014332 A1 | 1/2012 | Smith et al. | |
| 2012/0034913 A1* | 2/2012 | Wang | H04W 16/14 455/426.1 |
| 2012/0057490 A1 | 3/2012 | Park et al. | |
| 2012/0082273 A1* | 4/2012 | Chang | H04B 17/0042 375/346 |
| 2012/0094681 A1 | 4/2012 | Freda et al. | |
| 2012/0120887 A1 | 5/2012 | Deaton et al. | |
| 2012/0134328 A1* | 5/2012 | Gauvreau | H04L 5/0037 370/329 |
| 2012/0163309 A1* | 6/2012 | Ma | H04B 7/2606 370/329 |
| 2012/0202544 A1 | 8/2012 | Kim et al. | |
| 2012/0207047 A1 | 8/2012 | Liao | |
| 2012/0224470 A1 | 9/2012 | Jeong et al. | |
| 2012/0276945 A1* | 11/2012 | Chindapol | H04W 48/20 455/525 |
| 2012/0327876 A1 | 12/2012 | Ouchi et al. | |
| 2013/0058294 A1 | 3/2013 | Miki et al. | |
| 2013/0294489 A1* | 11/2013 | Thibeault | H04N 7/17309 375/222 |
| 2014/0036881 A1* | 2/2014 | Kim | H04L 5/001 370/336 |
| 2014/0079016 A1* | 3/2014 | Dai | H04L 5/0041 370/330 |
| 2015/0249531 A1* | 9/2015 | Lindoff | H04L 1/1812 370/280 |

FOREIGN PATENT DOCUMENTS

| | | | | |
|---|---|---|---|---|
| JP | 2012-169939 A | 9/2012 | | |
| JP | 2013-524637 A | 6/2013 | | |
| JP | 2013-543333 A | 11/2013 | | |
| JP | 2013-546215 A | 12/2013 | | |
| JP | 2014-504833 A | 2/2014 | | |
| WO | WO 2007126346 A1 * | 11/2007 | | H04W 52/242 |
| WO | WO 2011/047694 A1 | 4/2011 | | |
| WO | WO 2011/123466 A1 | 10/2011 | | |
| WO | WO 2012/041254 A1 | 4/2012 | | |
| WO | WO 2012/051151 A1 | 4/2012 | | |
| WO | WO 2012051157 A1 | 4/2012 | | |
| WO | WO 2012/109989 A1 | 8/2012 | | |
| WO | WO 2012/118740 A1 | 9/2012 | | |

OTHER PUBLICATIONS

Web, William, "Using White Space for M2M", www.Neul.com, Jun. 2011, 11 pages.
Beek, Jaap va de et al., "TV White Space in Europe", IEEE Transactions on Mobile Computing, (11) 2, Feb. 2012, 11 pages.
Mishra, Mubaraq et al., "How much white space is there?", Department of Electrical Engineering and Computer Sciences, University of California at Berkeley, Technical Report No. UCB/EECS-2009-3, Jan. 2009, 15 pages.
"Cambridge TV White Spaces Trial: A Summary of the Technical Findings", Cambridge White Spaces Consortium, 2012, 44 pages.
"Recommendations for Implementing the Use of White Spaces: Conclusions from the Cambridge TV White Spaces Trial", Cambridge White Spaces Consortium, 2012, 16 pages.
FCC 12-36A1, Third Memorandum Opinion and Order, Apr. 2012, 35 pages.
Chen, Hou-Shin et al., "Spectrum Sensing for FM Wireless Microphone Signals", IEEE DySPAN,, Apr. 2010, 5 pages.
Perahia, Eldad et al., "Next Generation Wireless LANs—Throughput, Robustness, and Reliability in 802.11n", Cambridge University Press, 2008, 417 pages.
3GPP-TR36-814_V9-0-0_March2010_104pp.
European Telecommunications Standards Institute (ETSI), TR 102 907 V0.1.7, "Reconfigurable Radio Systems (RRS), Use Cases for Operation in White Space Frequency Bands", Sep. 2011, pp. 1-60.

* cited by examiner

| Channel | RSSI (dBm) |
|---|---|
| 22 | -50 |
| 23 | -55 |
| 24 | -57 |
| 25 | -59 |
| 26 | -56 |
| 31 | -71 |
| 33 | -68 |
| 34 | -59 |

|  | Primary Channel | | Secondary Channel | | Tertiary Channel | | Quaternary Channel | |
| --- | --- | --- | --- | --- | --- | --- | --- | --- |
|  | Avg MCS | Tx Power Alloc | Avg MCS | Tx Power Alloc | Avg MCS | Tx Power Alloc | Avg MCS | Tx Power Alloc |
| STA 1 | 5 | $P_{11}$ | 3 | $P_{21}$ | 3 | $P_{31}$ | 2 | $P_{41}$ |
| STA 2 | 4 | $P_{12}$ | 4 | $P_{22}$ | 2 | $P_{32}$ | 1 | $P_{42}$ |
| .. | .. | .. | .. | .. | .. | .. | .. | .. |
| STA 'N' | 6 | $P_{1N}$ | 5 | $P_{2N}$ | 2 | $P_{3N}$ | 2 | $P_{4N}$ |
| Average across all STAs | 5.3 | - | 4.7 | - | 3.9 | - | 2.6 | - |

| | | Primary Channel | | Secondary Channel | | Tertiary Channel | | Quaternary Channel | |
|---|---|---|---|---|---|---|---|---|---|
| | | MCS | Tx Power Alloc | MCS | Tx Power Alloc | MCS | Tx Power Alloc | MCS | Tx Power Alloc |
| STA 'k' | QoS 1 | 5 | $P_{1k}^{(1)}$ | 3 | $P_{2k}^{(1)}$ | 3 | $P_{3k}^{(1)}$ | 2 | $P_{4k}^{(1)}$ |
| | QoS 2 | 4 | $P_{1k}^{(2)}$ | 4 | $P_{2k}^{(2)}$ | 2 | $P_{3k}^{(2)}$ | 1 | $P_{4k}^{(2)}$ |
| | QoS 3 | 6 | $P_{1k}^{(3)}$ | 2 | $P_{2k}^{(3)}$ | 2 | $P_{3k}^{(3)}$ | 2 | $P_{4k}^{(3)}$ |
| | QoS 4 | 5 | $P_{1k}^{(4)}$ | 3 | $P_{2k}^{(4)}$ | 3 | $P_{3k}^{(4)}$ | 1 | $P_{4k}^{(4)}$ |

US 10,050,762 B2

CHANNEL QUALITY MEASUREMENT AND TRANSMIT POWER ALLOCATION IN A DYNAMIC SPECTRUM MANAGEMENT SYSTEM

CROSS REFERENCE TO RELATED APPLICATION

This application claims the benefit of U.S. Provisional Application No. 61/704,766, filed Sep. 24, 2012, and U.S. Provisional Application No. 61/706,993, filed Sep. 28, 2012, both of which are hereby incorporated by reference herein.

BACKGROUND

In a Dynamic Spectrum Management (DSM) system, one or more channel metrics may be used to estimate the quality of respective channels. For example, a Received Signal Strength Indicator (RSSI) associated with a channel may be measured, for instance at the physical layer (PHY). A physical layer RSSI (PHY RSSI) measurement may be used in a channel ranking process employed by the DSM system.

A DSM engine associated with the DSM system may be configured with a primary channel and one or more non-primary channels (e.g., a primary channel and up to three non-primary channels in a channel aggregation).

Typically, PHY RSSI measurements of a channel may be made only when a packet is received, for example a data packet and/or an acknowledgment (ACK) in a data frame, or the like. The primary channel of a channel aggregation may be used to maintain authentication and/or an association between a DSM engine (e.g., implemented in an access point (AP)) and a client of the DSM system (e.g., a station (STA)). A PHY RSSI measurement may be obtained for the primary channel in accordance with a regular interval, for example, when packets are exchanged in order to maintain the association between the AP and the STA.

When non-primary channels are part of a channel aggregation, there may be scenarios where there may be no in the uplink (UL) data and/or ACKs sent from the STA to the AP such that the AP may not be able to perform PHY RSSI measurements on one or more of the non-primary channels. Without adequate channel quality measurements of the non-primary channels, a channel ranking performed by the DSM engine may result in the selection of poor quality channels, which may result in lower throughput rates.

A medium access control (MAC) level carrier aggregation system may be used to aggregate multiple physical layer chains at the MAC layer. Because these PHY chains operate on different spectral fragments (e.g., channels), the quality on each link could be different and dependent on co-channel or adjacent channel interference levels, propagation loss, transmit power, receiver noise floor, spectrum flatness, etc. corresponding to each channel.

SUMMARY

Disclosed herein are methods, systems and apparatuses for performing channel quality measurements, selecting channels for carrier aggregation and allocating transmit power for carrier aggregation in a Dynamic Spectrum Management (DSM) system.

A DSM client may operate with a set of aggregated active channels that may include a primary channel and one or more non-primary channels. The DSM client and/or the DSM engine associated with the DSM client may determine whether to trigger a channel quality measurement on a non-primary channel based on a previous activity associated with the non-primary channel. For example, the DSM engine and/or the DSM client may trigger a channel quality measurement on the non-primary channel on a condition that a predetermined period of time has lapsed since the last activity on the non-primary channel in the uplink (UL).

For example, upon determining to trigger the channel quality measurement on a non-primary channel, the DSM engine may trigger a UL data sending event on the non-primary channel, by sending Transmission Control Protocol (TCP) downlink data to a DSM client on the non-primary channel, sending a clear channel assessment message to the DSM client on the non-primary channel, sending a channel quality measurement request, and/or requesting a data frame to be sent on the non-primary channel. The UL data sending event may lead to the DSM client sending a data frame such as a NULL data frame on the non-primary channel, which may allow the quality measurement pertaining to the non-primary channel to be performed.

For example, upon determining to trigger the channel quality measurement on a non-primary channel, the DSM client may trigger a data sending event on the non-primary channel. For example, the DSM client may send a data frame, such as a NULL data frame, a management data frame and/or a control data frame, on the non-primary channel to an associated access point, may send a management frame on the non-primary channel to the associated access point, and/or may send a control frame on the non-primary channel to an associated access point. The DSM engine may receive the data frame via the non-primary channel and may determine the channel quality for the non-primary channel based on the received data frame.

The DSM engine may select channels for carrier aggregation based on the channel quality measurements based on one or more channel quality thresholds. The DSM engine may compare the channel quality of an available channel to a low channel quality threshold, and may determine whether to add the channel to a candidate list associated with the DSM client based on the comparing. For example, the DSM engine may determine that the channel is excluded from the candidate list when the channel quality is below the low channel quality threshold. The DSM engine may compare the channel quality of a candidate channel (e.g., a channel on the candidate list) to a range extension threshold. For example, the DSM engine may determine that the candidate channel is excluded from the active set associated with DSM client if the channel quality of the candidate channel is below the range extension threshold. For example, the DSM engine may determine that the candidate channel is excluded from the active set associated with DSM client if a difference between the channel quality of the candidate channel and the channel quality of the primary channel exceeds a delta threshold. The DSM engine may select a channel as an active channel in the active set associated with the DSM client based on a determination that the channel quality of the channel reaches or exceeds a low channel quality threshold, that the difference between the channel quality of the channel and the channel quality of the primary channel is less than a delta threshold, and that the channel quality of the channel reaches or exceeds a range extension threshold.

The DSM engine may perform respective quality measurements on multiple channels and store the respective quality values in a database. Time-averaged channel qualities for the channels may be computed based on the stored quality values for computing transmit power distribution across the channels. For example, the DSM engine may include a channel management function (CMF) and at least one access point (AP). The CMF may allocate transmit power for carrier aggregation for a DSM client. The CMF may receive a link quality report that may include channel quality information of the channels associated with the DSM client. The CMF may compute a time-averaged channel quality for each of the channels, and compute the transmit power distribution across the channels based on the time-averaged channel qualities for the channels. The CMF may send a transmit power allocation message with transmit power distribution across the channels to the DSM client.

Transmit power may be assigned based on link-quality per channel. A link quality database (LQD) may include channel quality information such as average MCS or SINR estimates per DSM client, per QoS, and/or per active channel based on periodic MCS/SINR updates from an AP, and/or measurements of MCS and SINR per channel may be considered by CMF channel selection. The SINR may be calculated based on RSSI and interference RSSI measurements. The LQD may reside in a CMF.

An active channel Tx power allocation vector may be created by a CMF and reported to the AP for a respective DSM client and a respective QoS. The Tx power allocation vector configurations may be signaled to the AP. Active channel(s) may be selected such that data throughput and range may be maximized and/or the MCS/SINR gap between aggregated channels may be minimized.

Transmit power distribution across active channels at the AP may depend on a trade-off between coverage and throughput. To have an extended coverage area, and thus include as many DSM clients as possible, the Tx power may be maximized, which in turn means fewer channels sharing the total power. To provide enhanced throughput, more channels may be aggregated, thus spreading the power across many channels, which in turn may result in reducing coverage area of individual channels.

DETAILED DESCRIPTION

Figure 1A:
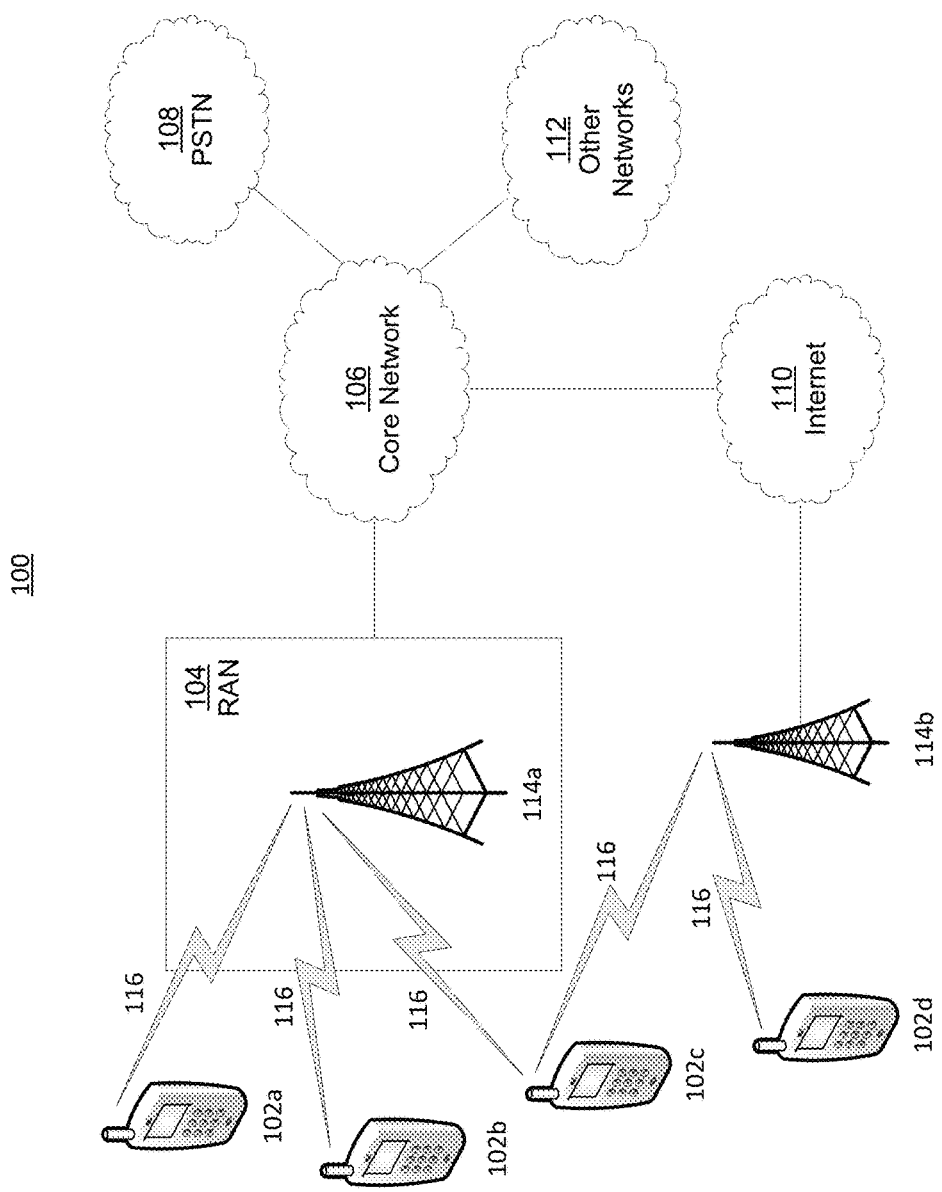
FIG. 1A depicts a system diagram of an example communications system in which one or more disclosed embodiments may be implemented.

FIG. 1A is a diagram of an example communications system 100 in which one or more disclosed embodiments may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
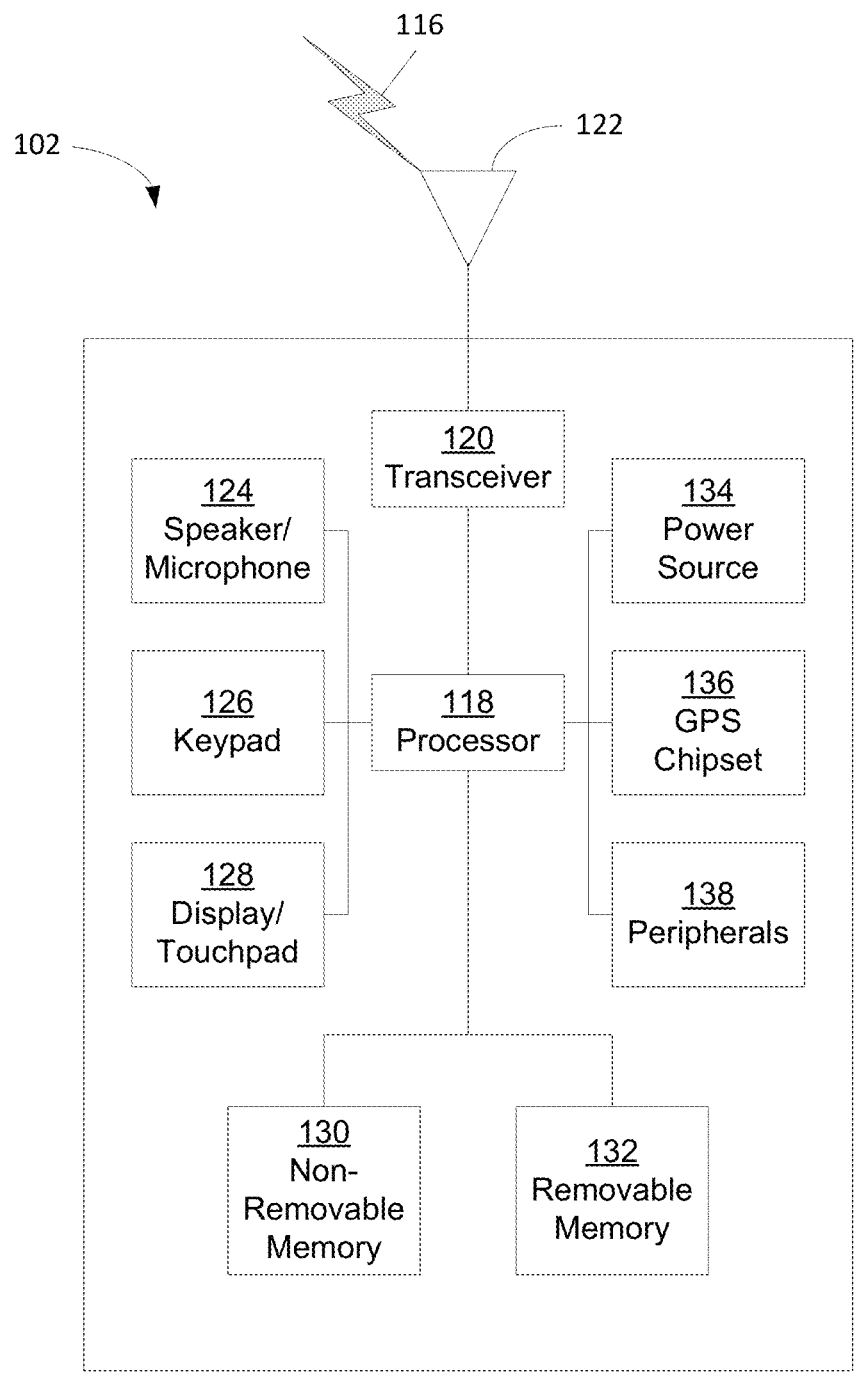
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
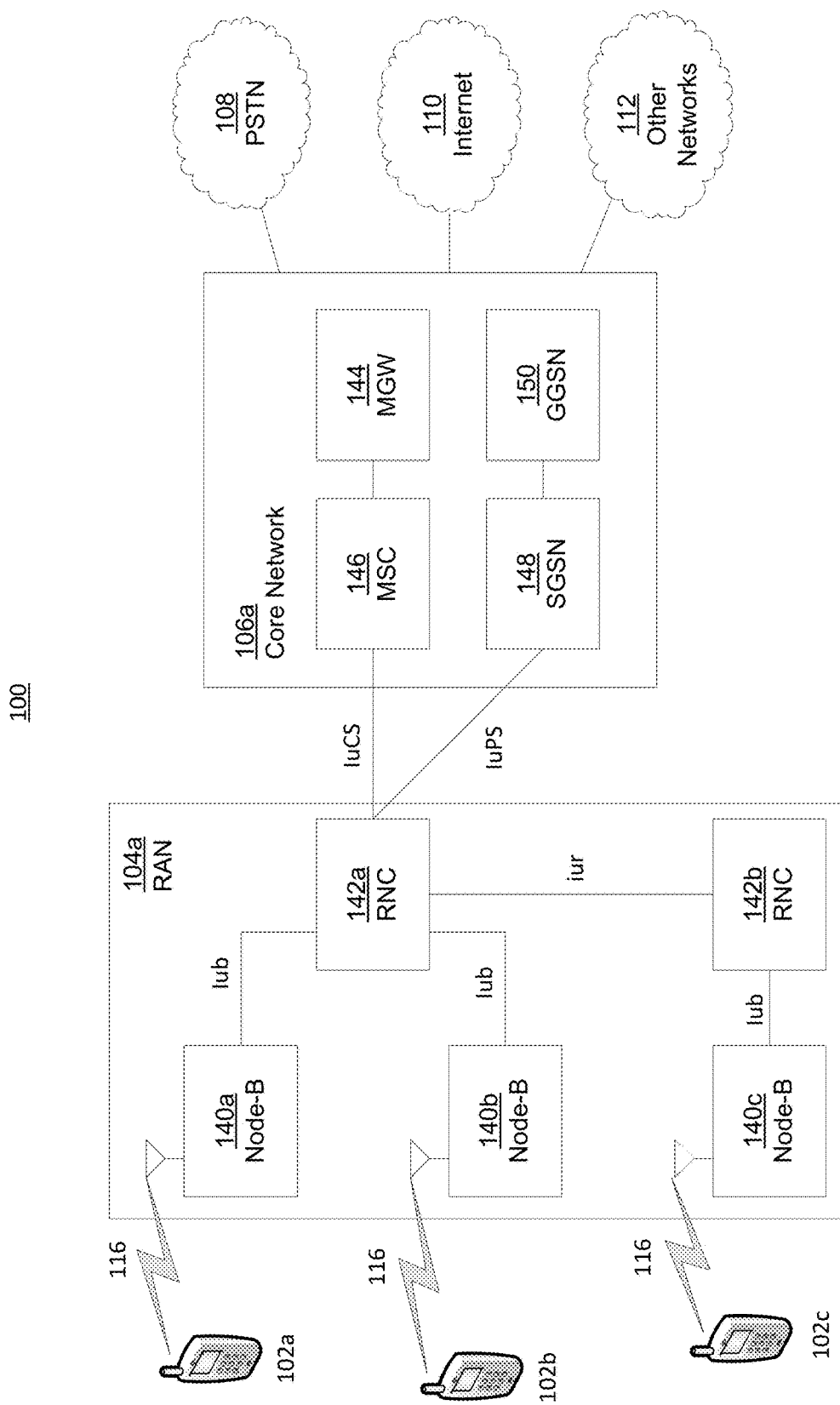
FIG. 1C depicts a system diagram of an example radio access network and an example core network that may be used within the communications system illustrated in FIG. 1A.

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, and 102c over the air interface 116. The RAN 104a may also be in communication with the core network 106a. As shown in FIG. 1C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
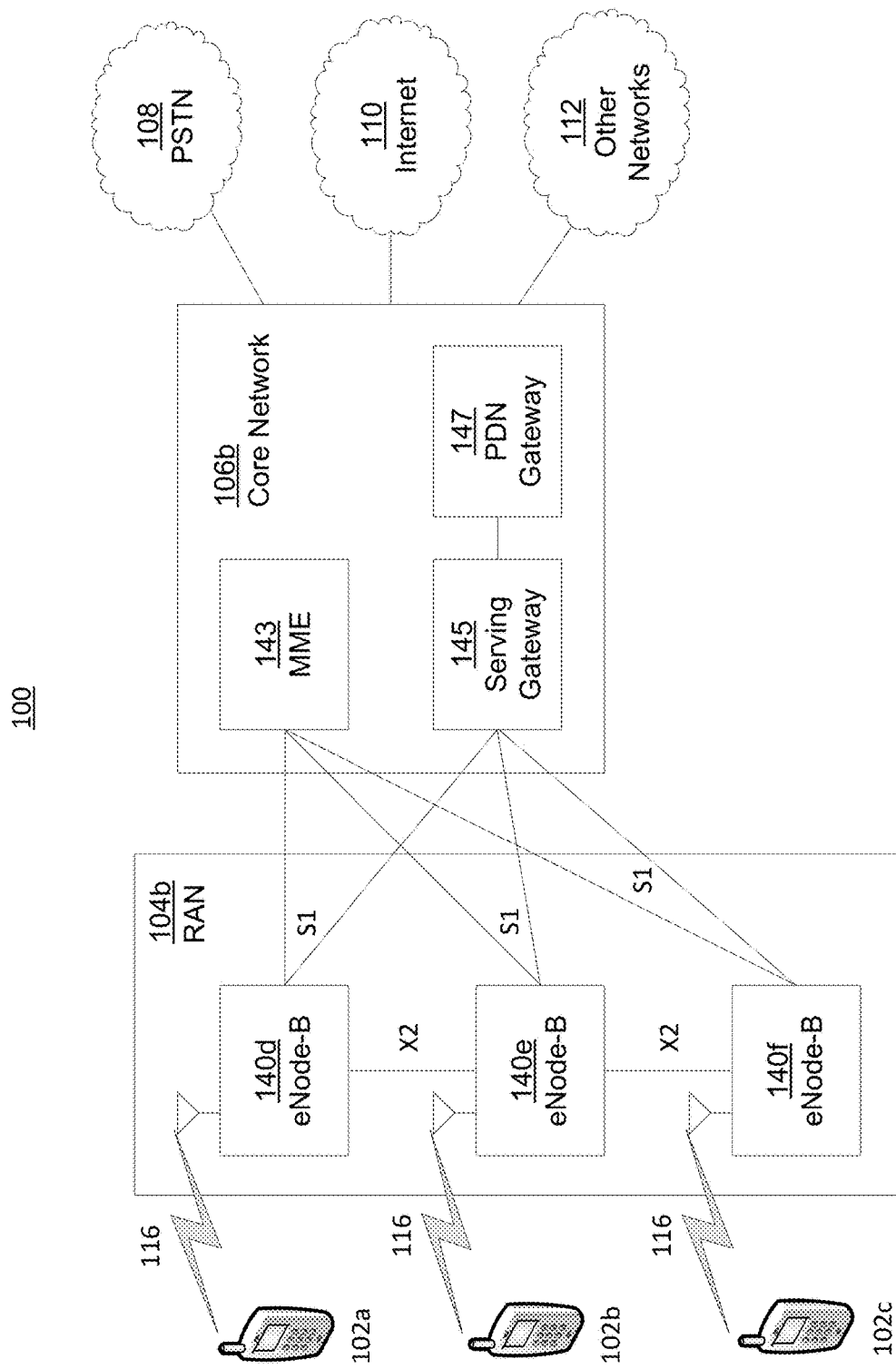
FIG. 1D depicts a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 140d, 140e, 140f, though it should be appreciated that the RAN 104b may include any number of eNode-Bs while remaining consistent with an embodiment. The eNode-Bs 140d, 140e, 140f may each include one or more transceivers for communicating with the WTRUs 102a, 102b, 102c over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102a.

Each of the eNode-Bs 140d, 140e, and 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements is depicted as part of the core network 106b, it should be appreciated that any one of these elements may be owned and/or operated by an entity other than the core network operator.

The MME 143 may be connected to each of the eNode-Bs 140d, 140e, and 140f in the RAN 104b via an S1 interface and may serve as a control node. For example, the MME 143 may be responsible for authenticating users of the WTRUs 102a, 102b, 102c, bearer activation/deactivation, selecting a particular serving gateway during an initial attach of the WTRUs 102a, 102b, 102c, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102a, 102b, 102c. The serving gateway 145 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 145 may also be connected to the PDN gateway 147, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
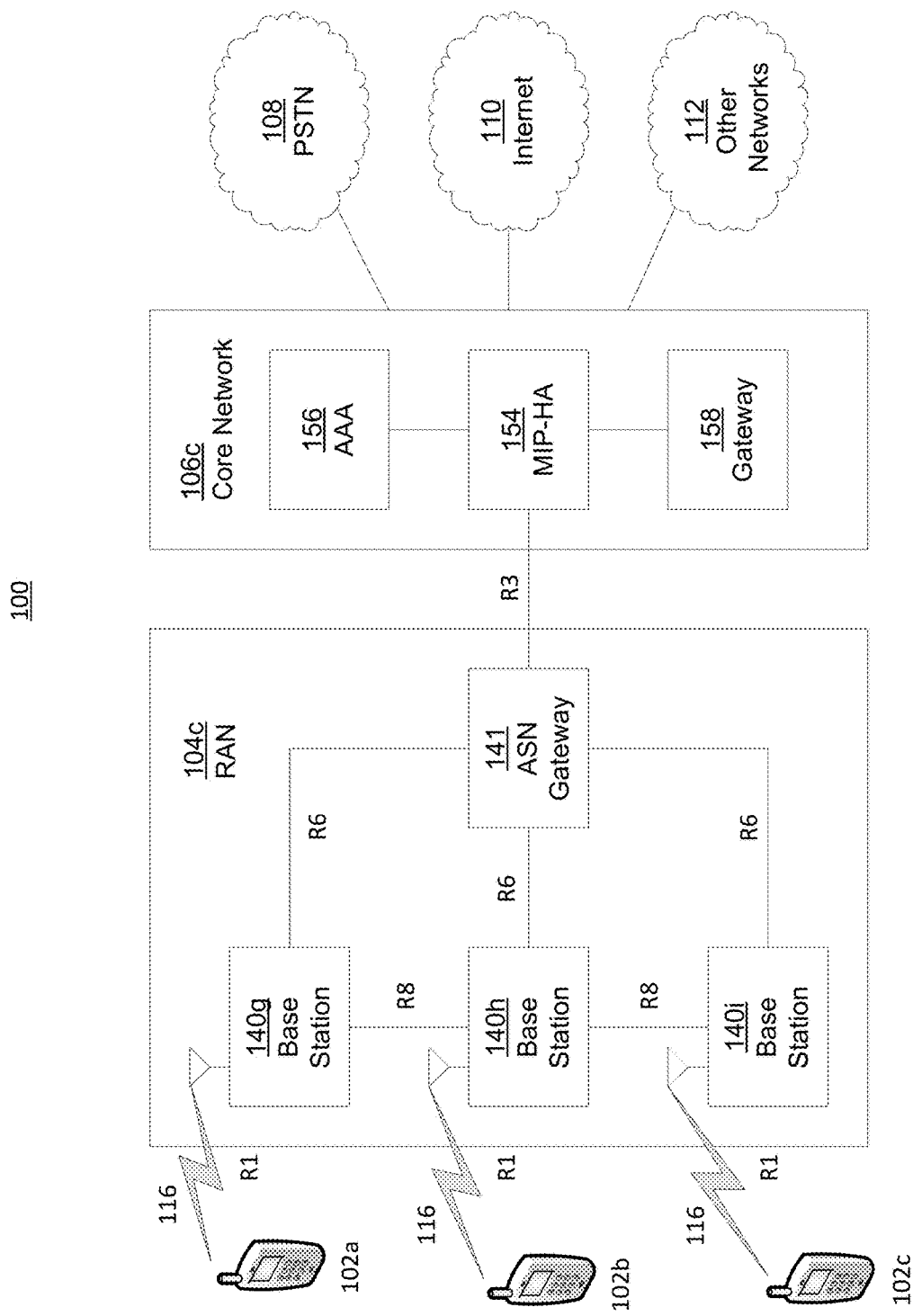
FIG. 1E depicts a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, and 102c over the air interface 116. As described herein, the communication links between the different functional entities of the WTRUs 102a, 102b, 102c, the RAN 104c, and the core network 106c may be defined as reference points.

As shown in FIG. 1E, the RAN 104c may include WTRUs 102a, 102b, 102c, and an ASN gateway 141, though it should be appreciated that the RAN 104c may include any number of base stations and ASN gateways while remaining consistent with an embodiment. The WTRUs 102a, 102b, 102c may each be associated with a particular cell (not shown) in the RAN 104c and may each include one or more transceivers for communicating with the WTRUs 102a, 102b, 102c over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102a. The base stations 140g, 140h, 140i may also provide mobility management functions, such as handoff triggering, tunnel establishment, radio resource management, traffic classification, quality of service (QoS) policy enforcement, and the like. The ASN gateway 141 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, and 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102a, 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 154, an authentication, authorization, accounting (AAA) server 156, and a gateway 158. While each of the foregoing elements is depicted as part of the core network 106c, it should be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional landline communications devices. In addition, the gateway 158 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

Figure 1F:
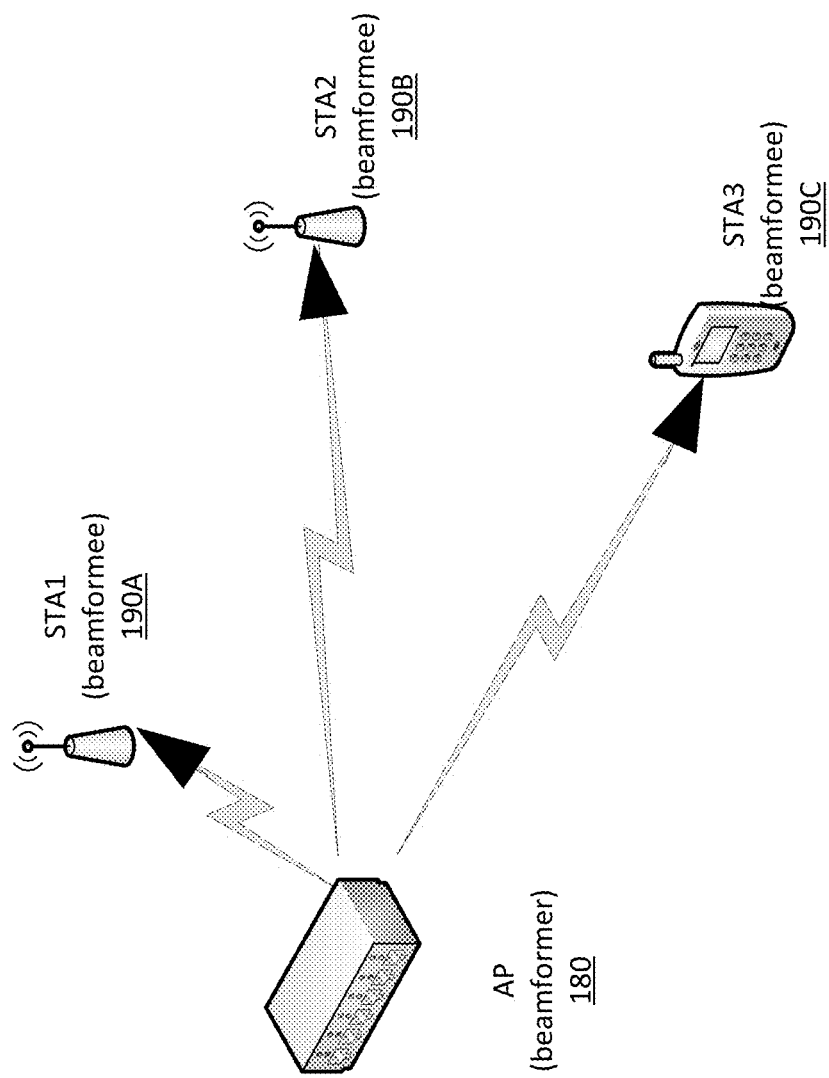
FIG. 1F is a system diagram of an embodiment of the communications system 100.

FIG. 1F is a system diagram of an embodiment of the communications system 100. A WLAN in infrastructure basic service set (IBSS) mode may have an access point (AP) 180 for the basic service set (BSS) and one or more stations (STAs) 190 associated with the AP as illustrated by example in FIG. 1F. The AP 180 may have access or interface to a Distribution System (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may sends traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an Independent BSS (IBSS) mode may have no APs, and the STAs 190 may communicate directly with each other. This mode of communication may be an ad-hoc mode.

Using the IEEE 802.11 infrastructure mode of operation, the AP 180 may transmit a beacon on a fixed channel, usually the primary channel. This channel may be 20 MHz wide, and may be the operating channel of the BSS. This channel may also be used by the STAs to establish a connection with the AP 180. The channel access in an IEEE 802.11 system may be Carrier Sense Multiple Access with Collision Avoidance (CSMA/CA). In this mode of operation, the STAs 190, including the AP 180, may sense the primary channel. If the channel is detected to be busy, the STA 190 may back off. One STA 190 may transmit at any given time in a given BSS.

In IEEE 802.11n, High Throughput (HT) STAs may use a 40 MHz wide channel for communication. This may be achieved, for example, by combining the primary 20 MHz channel, with an adjacent 20 MHz channel to form a 40 MHz wide contiguous channel.

In IEEE 802.11ac, very high throughput (VHT) STAs may support, e.g., 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC.

IEEE 802.11af and IEEE 802.11ah may support sub 1 GHz modes of operation. For these specifications the channel operating bandwidths may be reduced relative to those used in IEEE 802.11n, and IEEE 802.11ac. IEEE 802.11af may support 5 MHz, 10 MHz and/or 20 MHz bandwidths in the TV White Space (TVWS) spectrum, and IEEE 802.11ah may support 1 MHz, 2 MHz, 4 MHz, 8 MHz, and/or 16 MHz bandwidths, e.g., using non-TVWS spectrum. IEEE 802.11ah may support Meter Type Control (MTC) devices in a macro coverage area. MTC devices may have capabilities including, for example, support for limited bandwidths, and a requirement for a very long battery life.

In WLAN systems that may support multiple channels, and channel widths, e.g., IEEE 802.11n, IEEE 802.11ac, IEEE 802.11af, and/or IEEE 802.11ah, may include a channel which may be designated as the primary channel. The primary channel may have a bandwidth that may be equal to the largest common operating bandwidth supported by the STAs in the BSS. The bandwidth of the primary channel may be limited by the STA 190, of the STAs such as STAs 190A, 190B, 190C in operating in a BSS, which may support the smallest bandwidth operating mode. For example, in IEEE 802.11ah, the primary channel may be 1 MHz wide, if there may be STAs 190 (e.g., MTC type devices) that may support a 1 MHz mode even if the AP 180, and other STAs 190 in the BSS, may support a 2 MHz, 4 MHz, 8 MHz, 16 MHz, or other channel bandwidth operating modes. The carrier sensing, and NAV settings, may depend on the status of the primary channel. If the primary channel is busy, for example, due to a STA 190 supporting a 1 MHz operating mode transmitting to the AP 180, the available frequency bands may be considered even though majority of it may stay idle and available.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

Figure 2:
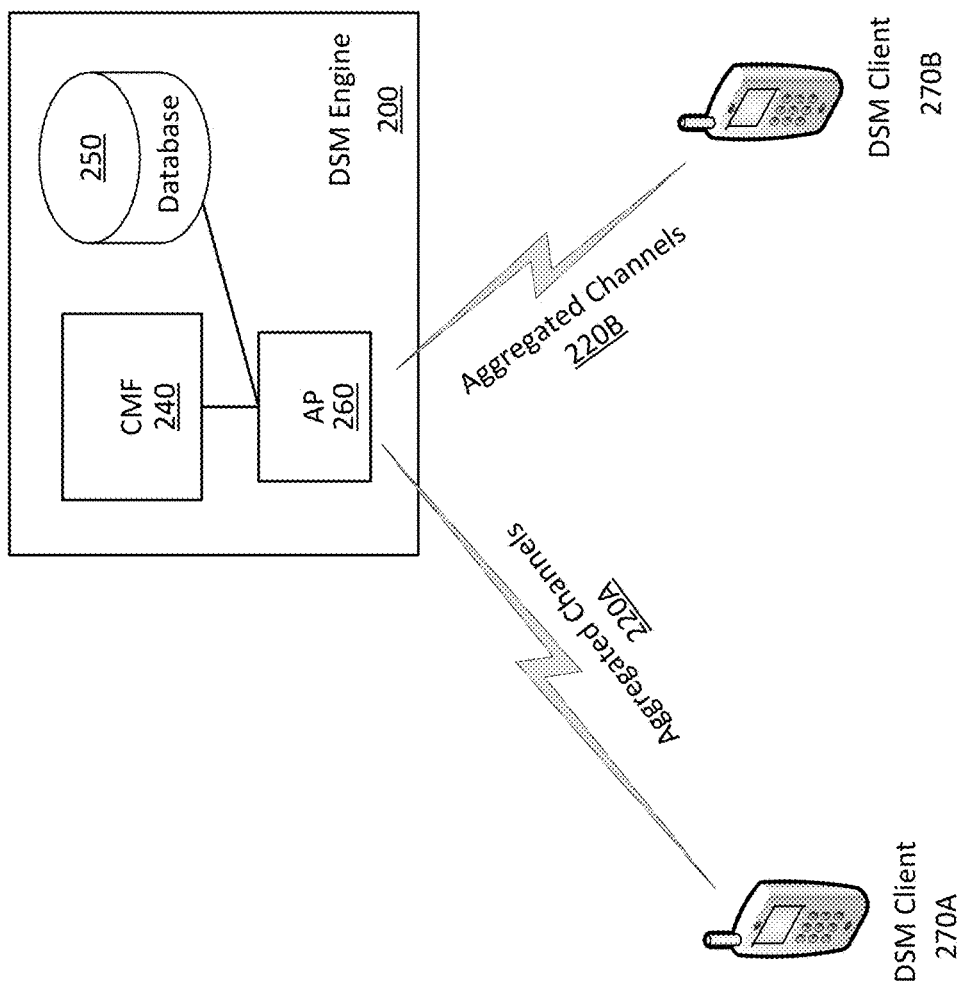
FIG. 2 depicts an example Dynamic Spectrum Management (DSM) system.

FIG. 2 depicts an example Dynamic Spectrum Management (DSM) system. A DSM system may include a DSM engine 200 and one or more DSM clients such as DSM clients 270A and 270B. The DSM engine 200 may be connected to a network. The network may be an extension of the DSM system. The network may include or may be connected to one or more communication networks, such as the core network 106, the Internet 110, and/or the networks 112 described above with respect to FIGS. 1A-1E.

A DSM client, such as DSM clients 270A and 270B associated with the DSM engine 200, may include or may be referred to as stations (STAs)). Example STAs may include a WRTU, a UE, a mobile device (MD), an end-user device, or the like. The DSM engine may include or may be partially or fully implemented in, a wireless network AP (e.g., a WiFi AP, a WiMAX AP, etc.), may be implemented separately from and associated with an AP, or any combination thereof. The DSM engine 200 may allocate one or more channels such as aggregated channels 220A and 220B to DSM clients 270A and 270B respectively. For example, a set of aggregated channels may include a primary channel and one or more non-primary channels aggregated. The aggregated channels between an AP and a DSM client may be referred to as active channels in an active set associated with the DSM client. For example, the active set for DSM client 270A may include the aggregated channels 220A.

For example, as shown in FIG. 2, the DSM engine 200 may include a channel management function (CMF) 240, one or more APs such as AP 260, and/or a database such as channel quality database 250. The channel quality database 250 may include information indicative of the respective channel quality information of channels associated with, or available to, the DSM engine 200.

The CMF 240 may include a protocol logic entity for communicating channel and cognitive information with other devices. The CMF 240 may manage and/or allocate one or more channels at AP 260. The allocation may be based, for example, on respective channel metrics pertaining to the one or more channels that may be received by the DSM engine 200. The CMF 240 may manage, rank, allocate and/or monitor the one or more channels, for example to ensure that the DSM system operates reliably and/or efficiently, using channels having the highest quality among available channels. Based on one or more respective physical layer Received Signal Strength Indicator (PHY RSSI) measurements performed at the AP, quality information (e.g., received from a Sensing Tool Box (STB)) and/or applicable policy rules, the CMF 240 may select one or more channels to be used by the DSM system.

As shown in FIG. 2, the DSM engine 200 may include one or more APs such as AP 260. In an embodiment, the APs may be replaced by eNBs, HeNBs, base stations and/or WTRUs. The DSM engine 200 may provide services for access to the opportunistic bands by a cellular system. An AP, eNB, HeNB or base station, may manage a different Radio Access Technologies (RAT) such as e.g., 802.11n, 802.11g, LTE, LTE-A, WCDMA. An AP, eNB, HeNB or base station, may manage the same RAT while operating in the TVWS band. Operation may occur in other bands such as the industrial, scientific and medical (ISM) and licensed.

If the DSM system operates with downlink (DL) data transmission in Transmission Control Protocol (TCP), one or more acknowledgments (ACKs) that may be sent back to the AP by the STA may be used to perform respective PHY RSSI measurements for non-primary channels (e.g., of one or more channels of a channel aggregation). For example, when the data type of the DL data transmission is User Datagram Protocol (UDP), ACKs may not be sent back to the AP, such that respective PHY RSSI measurement may not be performed on one or more of the non-primary channels based on the ACKs. In an embodiment, the AP 260 may perform a PHY RSSI measurement on the primary channel and may determine the channel quality of the non-primary channels based on the PHY RSSI measurement pertaining to the primary channel for channel ranking and/or selection. For example, the AP 260 may use the PHY RSSI measurement pertaining to the primary channel for the non-primary channels until an UL frame is received on the respective non-primary channels.

Using one or more PHY RSSI measurements performed on a primary channel as estimates for one or more non-primary channels may be suitable, for example, if PHY RSSI measurements across channels are substantially similar. When PHY RSSI measurements across a plurality of channels (e.g., CH 22 to CH51) may vary (e.g., by as much as 15 dBm between the primary channel and a non-primary channel). Several factors may contribute to variation in over-the-air (OTA) PHY RSSI measurements, such as external interference, noise, antenna separation, antenna type and/or multipath fading. In example scenarios where variations in PHY RSSI measurements among channels are observed, associated channel ranking (e.g., as performed by a CMF) may be flawed. For instance, a poor quality channel may be ranked as a good quality channel and/or a good quality channel may be ranked as a poor quality channel.

One or more alternate channels may be selected to join the active set associated with a DSM client. An alternate channel may be inactive, and may be referred to as an inactive channel or a candidate channel herein. The terms are used interchangeably herein. For example, a candidate list for a DSM client may include one or more alternate/candidate channels that may be considered for the active set associated with the DSM client.

Channel selection may be performed based on results of channel ranking. For example, the available channels, including the active channels and the alternate channels, may be ranked based on their respective channel qualities. The channel qualities may be represented via channel quality metrics. In an embodiment, the channel(s) of the highest quality may be selected to be in the active set.

One or more poor quality channels may be ranked higher if inadequate estimates of respective PHY RSSIs of the one or more channels are used in place of respective actual PHY RSSI measurements. One or more channels that are undeservedly given higher ranks may be selected for channel aggregation, which may result in lower throughput rates of the aggregated channels. A good quality channel may be deemed unusable, which may unnecessarily limit the selection of available channels.

A variation among respective PHY RSSI values among one or more channels may cause the CMF to re-rank the channels, for example when a non-primary channel is promoted to a primary channel (e.g., each time a non-primary channel is promoted to a primary channel).

When a non-primary channel is promoted to a primary channel, the PHY RSSI of the non-primary channel may be measured and/or updated. The respective PHY RSSIs of one or more channels (e.g., non-primary channels aggregated with the promoted non-primary channel) may be updated, for example to the PHY RSSI of the promoted non-primary channel. Such an update, for instance along with an RSSI measurement for one or more channels, may cause the one or more channels to be re-ranked. Re-ranking may be accompanied by a channel switch. A channel switch may reduce data rates (e.g., momentarily).

Detection of interference on the primary channel and/or false interference detections on the primary channel may cause a non-primary channel to be promoted as the primary channel. Such a promotion may cause one or more channels (e.g., non-primary channels aggregated with the promoted non-primary channel) to be re-ranked, for example using the PHY RSSI of the promoted non-primary channel. Re-ranking of one or more channels using the PHY RSSI of the promoted non-primary channel may cause variation of the PHY RSS on a candidate channel, for example as it updates (e.g., successively) using respective PHY RSSIs of one or more channels promoted to be primary channels. Such PHY RSSI variations may lead to excessive channel switching.

A DSM system may include an Advanced Channel Aggregation (ACA) scheme, such as an ACA with intelligent data packing that may promote good channel aggregation. An ACA scheme may include Aggregated MAC Protocol Data Unit (A-MPDU) aggregation, for example performed in accordance with High throughput MAC layer multicasting (HIMAC). Channels used for aggregation in an ACA scheme, for example, channels used for aggregation, may have respective channel conditions that are similar to one another (e.g., rated as good), so as to maximize data throughput and/or range. An ACA scheme may be implemented using PHY RSSI values for the respective non-primary channels. An ACA scheme may be implemented so as to minimize a signal to interference plus noise power ratio (SINR) gap between aggregated channels, for example using substantially accurate PHY RSSI values of one or more respective non-primary aggregated channels.

If a DSM engine is configured to operate in an AutoRate mode, the aggregated channels may have respective quality ratings that may be substantially similar, such that respective transmit rates on one or more of the aggregated channels (e.g., all the aggregated channels) may be similar. If one or more of the aggregated channels are of a poor quality, for example such that the dropped packets are beyond respective allowable thresholds, the AutoRate mode may be invoked such that respective transmit rates for the one or more poor quality channels may be decreased, for example, which may result in lower overall throughput.

A DSM system may support multiple DSM clients. Respective impacts to a DSM system pertaining to supporting multiple DSM clients may be determined (e.g., accounting for multiple STAs).

If one or more DSM clients associated with a DSM system are mobile (e.g., in motion, recently in motion, etc.) respective PHY RSSI values associated with the one or more mobile DSM clients may be and/or may become stale (e.g., no longer accurate). Respective data transmissions (e.g., transmissions in progress) of one or more mobile DSM clients may be maintained, for example if channel quality measurements are timely performed and/or accurately determined for the channels (e.g., in accordance with a rapid and/or efficient PHY RSSI measurement scheme).

Figures 13, 14:
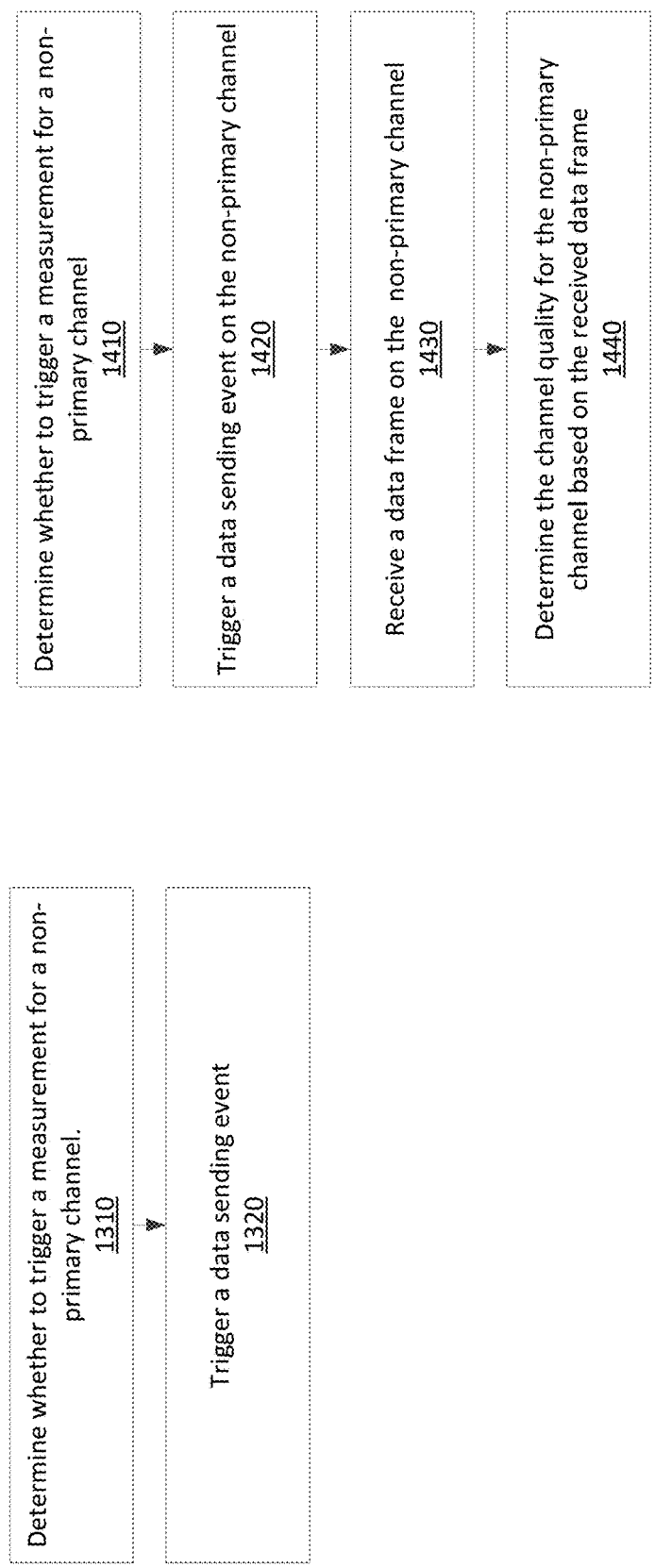
FIG. 13 shows an example process for performing a channel quality measurement.
FIG. 14 shows an example process for performing a channel quality measurement.

FIG. 13 shows an example process for performing a channel quality measurement. The process may be performed by one or more components in the DSM system. For example, an AP such as AP 260, a DSM client such as DSM client 270A, and/or a CMF such as CMF 240 as shown in FIG. 2 may perform this process. For example, the process may be performed by DSM engine 200 and one or more of the DSM client 270 as shown in FIG. 2.

As discussed above, a DSM system may use channel qualities to rank available channels and select channel(s) for aggregation. For example, the DSM engine 200 may perform channel quality measurements such as PHY RSSI measurements. A procedure may be implemented in the DSM system that may enable the DSM engine to update channel quality information such as a PHY RSSI value for a channel. Channel quality measurements for a non-primary channel may be triggered by one or more events. For example, channel quality measurements may be triggered in accordance with one or more occurrences of a pre-identified event. The event(s) and/or event trigger(s) may be implemented at one or more of the DSM engine 200 (e.g., in the AP 260) or one or more DSM clients 270 associated with the DSM engine 200.

As shown in FIG. 13, at 1310, whether to trigger a channel quality measurement for a non-primary channel may be determined. For example, a channel quality measurement may be triggered when few UL data packets and/or acknowledgment packets are transmitted on one or more non-primary channels. For example, when no UL data packets and/or acknowledgment packets are transmitted on a non-primary channel, it may be determined that a channel quality measurement for that non-primary channel is to be triggered. The triggering event may be responsive to a determination that quality measurement cannot be performed based on an amount of data traffic present on the non-primary channel.

For example, the determination may be based on a previous activity associated with the non-primary channel, such as the timing of the last transmission on that non-primary channel. It may be determined that the channel quality measurement on the non-primary channel is to be triggered on a condition that a predetermined period time has lapsed since the previous activity associated with the non-primary channel took place. For example, timer-based event triggers and/or packet count-based event triggers, and/or other suitable event triggers may be used to determine whether quality measurement should be performed on a non-primary channel. A timer-based event trigger may include an activity timeout function (e.g., activity timer) that may be started, for example, after authentication and/or association are completed. The timer may be reset or restarted, for example after a data sending event has occurred. The timer may be reset or restarted, for example when the DSM client sends an UL data frame on the non-primary channel. The activity timer may be configurable, for example, by the user.

One or more checks may be implemented before triggering the data sending event, such as an activity count that may indicate any transmit (TX) and/or receive (RX) activity occurrence (e.g., within a prior activity interval) and/or a check of one or more HW queues for pending transmissions, for example. Upon expiration of the timer, one or more data sending events may be triggered.

A packet count based event trigger may be based, for example, on a user configurable packet failure count, such that when a packet failure count exceeds a configurable threshold, one or more data sending events may be triggered.

If respective PHY RSSI values for one or more non-primary channels are determined to be stale, for example by a DSM engine, the PHY RSSI measurements may be updated, and a timer based event trigger may be used. On a condition that the DSM system experiences throughput rates below a threshold, the PHY RSSI values corresponding to one or more channels may be updated. A packet count based event trigger may be used to verify the PHY RSSI measurements, for example.

As shown in FIG. 13, at 1320, a data sending event on the non-primary channel may be triggered. A data sending event may induce one or more data frames being sent on the non-primary channel in the active set such that channel measurement may be performed on the channel. For example, a data sending event may induce sufficient amount of data traffic on an UL path so as to enable the performance of PHY RSSI measurement(s) on that UL path. An UL path may include one or more aggregated non-primary channels. For example, a data sending event may induce a sufficient amount of data traffic on a non-primary channel so as to enable the AP 260 to perform PHY RSSI measurement(s) on that non-primary channel. Data sending events may include AP-triggered events and/or client-triggered events (e.g., STA-triggered events).

One or more components in the DSM engine 200 may trigger data sending events for channel quality measurement. For example, an AP such as AP 260 may trigger a data sending event. For example, a CMF such as CMF 240 may trigger a data sending event. For example, the AP 260 may trigger an event that may send TCP DL data to a DSM client such as DSM client 270A. The AP 260 may trigger an event that may send a channel quality measurement (CQM) request message to a DSM client such as DSM client 270A. The CQM request message may include a Clear Channel Assessment (CCA) message. For example, the CMF 240 may send a CQM request message and/or one or more Information Elements (IEs) to the DSM client 270A. Upon receiving the CQM request message, the DSM client 270A may reply, for example, via an active channel. For example, the AP 260 may indicate to a DSM client such as DSM client 270A that a data frame is to be sent on a specific non-primary channel. For example, upon determining to trigger channel quality measurement a non-primary channel, the AP 260 may indicate to a DSM client such as DSM client 270A to send a data frame on that channel.

A DSM client may trigger data sending event(s) for channel quality measurement. For example, a DSM client may send one or more data frames on a non-primary channel to an associated AP such that the AP may perform channel quality measurement on the non-primary channel. To illustrate, the DSM client 270A may trigger an event that may send one or more NULL data frames from the DSM client 270A to the AP 260. A NULL frame may include a NULL data frame. A NULL data frame may include a frame that may be meant to contain no data. A NULL data frame may include a standard header that may indicate the frame does not carry any data (e.g., substantive data).

For example, a DSM client such as DSM client 270A may trigger an event that may send management frames to an AP such as AP 260. Sending management frames from a DSM client to an AP may use directed Probe and/or Response management frames, for example. The DSM client 270A may trigger an event that may send one or more control frames from the DSM client 270A to the AP 260. The DSM client 270A may trigger an event that may obtain a PHY RSSI value at a lower portion of a MAC layer (LOMAC). An associated DSM client may periodically send one or more directed Probe and/or Request management frames (e.g., directed to a specific Service Set Identifier (SSID)) on one or more active channels (e.g., all active channels), which may allow the AP to update the PHY RSSI.

FIG. 14 shows an example process for performing a channel quality measurement. As shown, at 1410, whether to trigger a channel quality measurement for a non-primary channel may be determined. For example, an AP such as AP 260 may make this determination as described herein with respect to 1310 shown in FIG. 13. As shown in FIG. 14, at 1420, a data sending event on the non-primary channel may be triggered. For example, the AP 260 may trigger the data sending event on the non-primary channel based on a determination that a channel quality measurement for the non-primary channel is to be triggered, as described herein with respect to 1320 shown in FIG. 13. In response to the trigger, a data sending event may take place. For example, the DSM client 270A may send one or more data frames to the AP 260. The data frames may include one or more NULL data frames.

At 1430, a data frame may be received on the non-primary channel. The data frame may be triggered by the data sending event for the purpose of measuring the channel quality of the non-primary channel. For example, the AP 260 may receive the NULL data frame sent by the DSM client 270A in response to the data sending event triggered at 1420. At 1440, the channel quality for the non-primary channel may be determined based on the received data frame. For example, the AP 260 may determine that the received data frame is a NULL data frame based on an indicator included in the data frame. The AP 260 may measure the quality of the non-primary channel based on the NULL data frame. For example, the RSSI may be measured. Based on measured RSSI, the CMF 240 may update the channel ranking.

As such, the channel quality, such as RSSI, of a non-primary channel may be measured when the non-primary channel is not scheduled to transmit any UL data. The channel quality measurement may be triggered, for example, based on data type, data count and/or time based events.

In an embodiment, channel quality measurement may be performed on the active channels associated with a channel aggregation. For example, at least one frame may be sent on each active channel associated with the channel aggregation, including the non-primary channels. Information elements exchanged in the context of one or more CCA threshold messages may be used. The frame may include an IP data frame, and may be received by the AP such as AP 260. Use of information elements exchanged in a CCA message may lead to an accurate channel SINR and/or may lead to selection of a better quality channel.

The DSM engine 200 may allow the CMF 240 to change a CCA threshold such that a CCA message may be induced. The CMF 240 may dynamically change the CCA threshold at the AP 260 and/or at one or more associated DSM clients 270, for example. A CCA threshold message may be used as a dual purpose message.

Information elements (IEs) exchanged in a CCA message may include one or more of transmit power settings for one or more channels, RX sensitivity, and/or respective PHY RSSI measurements for the channel(s). The respective PHY RSSI measurements for a channel may be included if available.

A channel reconfiguration may be triggered. For example, a Channel Switch Announcement (CSA) procedure may be performed. The AP 260 may send one or more CCA IEs to one or more associated DSM clients 270, for example via respective active channels. The one or more CCA IEs may be sent as part of a measurement report, for example. The DSM client(s) 270 may reply with the CCA IE(s) via the active channels. The AP 260 and/or the associated DSM client(s) 270 may perform PHY RSSI measurements on corresponding active channels, such that information for a CCA threshold adjustment may be readily available.

The channel quality of a non-primary channel may be estimated. For example, when few or no UL data packets and/or acknowledgment packets are transmitted on a non-primary channel or a candidate channel, the PHY RSSI value(s) pertaining to the channel may be estimated. In an embodiment, the channel quality of a non-primary channel may be estimated based on the primary channel power. A non-primary channel may include an active non-primary channel in the active set, or may include a candidate channel not part of the active set.

In an embodiment, the channel quality of a non-primary channel may be estimated based on previous measurement(s) on the channel. For example, a database such as the channel quality database 250 shown in FIG. 2 may store the most-recent quality indicators for one or more channels including the primary channel, active non-primary channels and/or candidate channels. The database may include a lookup table for looking up the value of quality indicator(s) for a channel. The quality indicator may include PHY RSSI values.

Figures 3, 4:
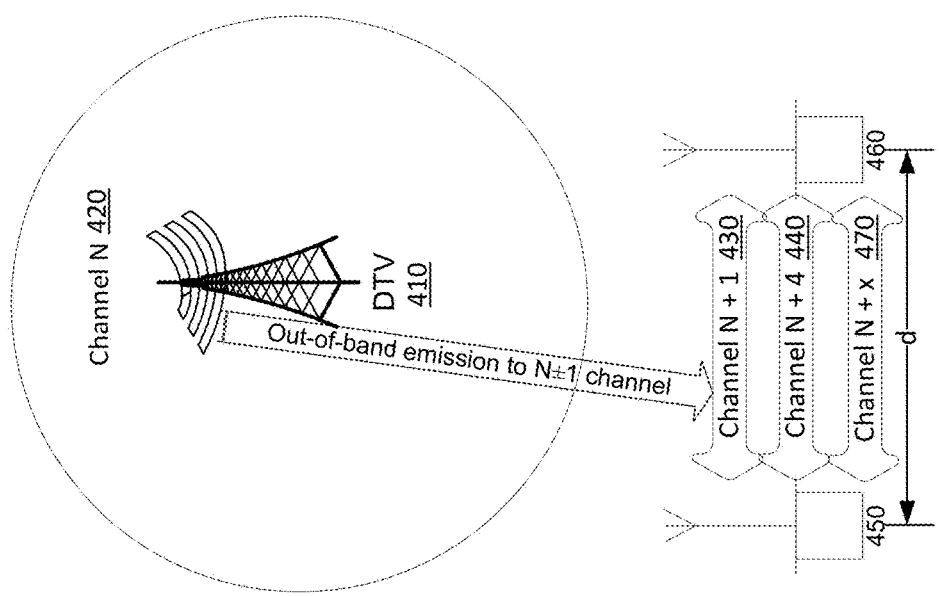
FIG. 3 depicts an example channel measurement lookup table.
FIG. 4 shows example operation on television white space (TVWS) channels.

FIG. 3 depicts an example channel measurement lookup table. For example, the table may include historic or previously-measured quality indicators for channels in the DSM system. As shown, eight representative channels, including a primary channel (channel 22) and seven non-primary channels (channels 23-34), one or more of which may be aggregated channels in the active set. The table may include respective quality indicators for the channels. The RSSI values in the table may be representative of PHY RSSI measurements that may have been performed on the corresponding channels recently.

For example, the RSSI value for a channel may be determined based on TCP transmission and/or the corresponding ACK/NACK transmission in the UL on the channel. After a period of time, an established TCP session may stop, and a UDP session may be started, such that UL packets may not be transmitted. When evaluating the channels, respective last-known PHY RSSI measurements in the database lookup table may be used. For example, use of values from the lookup table may supersede, in whole or in part, a PHY RSSI measurement pertaining to a primary channel as a PHY RSSI measurement for the non-primary channels.

The PHY RSSI value(s) in the lookup table may be, for example after an interval of time, considered stale. Stale values may be removed from the lookup table and/or replaced with more recently measured values. For example, a timer may be used to determine whether a channel quality indicator in the lookup table is sufficiently up-to-date to be used for channel ranking and/or channel selection. For example, a timer may correspond to a channel. The timer may be set or reset when the value of the channel quality indicator of the channel is updated. The timer may be configurable and may expire after a predetermined period of time. Upon expiration of the timer, a request may be made to update the channel quality indicator value for the channel. For example, a timer may correspond to a lookup table, or a particular channel in the lookup table. The timer may be set or reset when one or more values of the channel quality indicators in the table are updated. The timer may be configurable and may expire after a predetermined period of time. Upon expiration of the timer, a request may be made to update respective PHY RSSI values pertaining to the channels of the database and/or lookup table.

The database and/or lookup table may be located (e.g., stored) in an AP such as AP 260, one or more DSM clients associated with the AP such as DSM clients 270A and 270B, a CMF such as CMF 240, a suitable network element, a third party device, or any combination thereof.

In an embodiment, the channel quality of a non-primary channel may be estimated based on a calibration offset. The calibration offset for a channel may be determined as a function of hardware characteristics. The calibration offset for a channel may be deduced, for example by lab measurements, statically set based on factory settings, and/or semi-statically configured based on temperature, age and any other influencing characteristic of the DSM engine and/or its environment. The offset value may differ from channel to channel. The offset value may include a constant value.

For example, the RSSI value of a non-primary channel may be approximated based on the RSSI value of a primary channel and a calibration offset associated with the non-primary channel. The RSSI value of a non-primary channel may correspond to the RSSI value of the primary channel minus the calibration offset.

For example, the channel quality of an inactive channel may be estimated based on the channel quality of a reference active channel in the active set and a calibration offset associated with the inactive channel. The calibration offset may be associated with the inactive channel and the reference active channel. The reference active channel may include the primary channel, or an active non-primary channel. For example, the RSSI value of an inactive channel may be approximated based on the RSSI value of the reference active channel and the calibration offset associated with the inactive channel. Thus, the RSSI value of an inactive channel may be determined without switching the inactive channel into the active set.

Radio resource management (RRM) may enable dynamic throughput and range extension based on per-channel link quality awareness in medium access control (MAC)-level carrier aggregation systems. These RRM may provide an intelligent channel selection scheme that may improve the operational range and effective throughput based on specific radio frequency (RF) measurements and intelligent use of the total transmit power of the radio.

As described herein, channels may be selected to join the active set based on the respective channel quality metrics. In an embodiment, channel selection may be performed without considering the delta signal-to-interference ratio (SINR) among the active channels, and may not impose a lower bound on the channel quality metrics. The channel selection decision may not factor in the impacts on transmit power usage as a function of the number of channels in the aggregation.

In the case of MAC-level carrier aggregation of multiple TVWS channels, interference on the TVWS channels may originate from strong TV channel interference on adjacent channels or from interference from wireless TV band devices (TVBDs). The extremely noisy TVWS channels may include fixed strong TV interference and/or dynamic interference from peer TVBDs. The fixed strong TV interference may be powerful, such as 200 kW, transmissions from TV transmitters. The fixed strong TV interference may include up to 30 dB interference variation between adjacent and non-adjacent channels. For example, the fixed strong TV interference may equal to or be greater than 50% available channels adjacent to DTV in Europe, or may equal to or be greater than 30% available channels adjacent to DTV in USA. The dynamic interference from peer TVBDs may include uncoordinated TVWS channel usage among co-existing secondary networks. Such interference may experience fluctuated interference levels on different channels. The interference level may differentiate by as much as 15 dB among TVWS channels.

FIG. 4 shows example operations on TVWS channels. As shown, digital television (DTV) 410 may operate on Channel N 420. TVBD 450 and TVBD 460 may communicate via channel N+1 430 aggregated with one or more channels such as channel N+4 440 and channel N+x 470. DTV out-of-band emission to channel N+1 430 may be −86 dBm. There may be no DTV leakage to channel N+4 440. The thermal noise power spectral density (PSD) may be −174 dBm/Hz, and the noise figure may be 7 dB. Assume that the antenna height is 10 m, and the TVBD 450 and 460 each have a transmit (Tx) antenna and a receive (Rx) antenna for simplicity. The packet error rate (PER) may be 10%, modulation and coding scheme (MCS) selection may be performed, and line-of-sight path loss model at a frequency of 600 MHz may be used. The total Tx power for portable TVBD 450 may equal to 20 dBm, where the 20 dBm may be calculated by summing the transmit power of channel N+1 430 aggregated with channel N+4 440 (e.g., TxPowN+1(16 dBm)+TxPowN+4(17.5 dBm)).

Figures 5, 6:
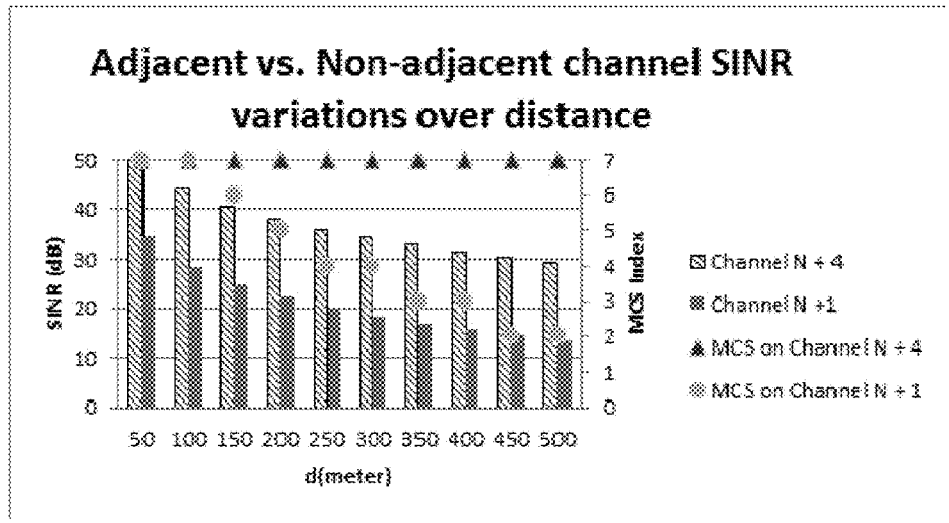
FIG. 5 shows a diagram comparing adjacent and non-adjacent channel signal-to-interference noise ratio (SINR) variations over distance.
FIG. 6 shows an example table in a channel quality database that may track the modulation and coding scheme (MCS) values for the channels in the system.

FIG. 5 shows a diagram comparing example adjacent and non-adjacent channel SINR variations over distance with four example channels. As shown, the SINR levels may vary significantly on the aggregated TVWS channels. Received power levels may be different on different TVWS bands/channels due to unequal fixed and dynamic interference environment. Optimal performance may be achieved with different MCS selections for each channel.

The maximum range (e.g., max coverage area) may be evaluated. For example, the number of DSM clients associated with an AP may be evaluated periodically. The maximum range may be evaluated using a Max-Power-Beacon (MPB) approach during active scan and/or using a Max-Power-Probe (MPP) approach during passive scan.

A periodic MPB approach may be used during active scanning. For example, an AP such as AP 260 may send a beacon every target beacon transmission time (TBTT) on the active channel(s). The maximum range may be evaluated and/or adjusted by maximizing the Tx power of the beacon on a primary channel and/or minimizing the Tx power on other channels during that time. To illustrate, the AP may use 90% of Tx power to transmit beacon on the primary channel and may use the remaining 10% power on the other channels during that time. The amount of Tx power to be used on the beacon may be allocated based on the maximum possible range that the AP may support. The maximum possible range that the AP may support may be determined based on a link budget analysis.

A DSM client far away from the AP may hear the beacon on the primary channel and may send an association request at max power allowed for that DSM client. The max power allowed by the DSM client may depend on the device class/mode. A metric or a metric-like RSSI may be used to measure the strength of the received signal from the DSM client. The DSM client may be mapped to a Tx power required by the AP to communicate with that DSM client.

A MPP request/response approach during passive scanning may be used to evaluate the maximum range of the AP. A DSM client may send a probe request signal on the primary channel at max power allowed for that DSM client. In response to the request, a metric or metric-like RSSI may be used to measure the strength of the signal from the DSM client. The DSM client may be mapped to a Tx power required by the AP to communicate with that DSM client. The mapping may be performed using a predefined mapping of RSSI to Tx power. The AP may send the metric to the CMF. The CMF may evaluate its radio resource management state. For example, the CMF may evaluate the number of DSM clients currently supported and medium resources available. The CMF may send an association response to the DSM client based on the evaluation.

A database, such as the channel quality database 250, may store link quality for the channels associated with the DSM clients. The DSM clients may be selected using the max-range evaluation approach described herein. For example, the channel quality (e.g., link quality) per channel per associated DSM client may be tracked and maintained in the database 250. The channel quality may include time-averaged SINR and/or time-averaged MCS. A time-averaged value may include an exponentially weighted moving average. The channel quality database 250 may be updated by the CMF and/or the AP. The AP may compute an average SINR or average MCS across the DSM clients for an active channel. The channel quality database 250 may include one or more tables for storing link quality information for the channels in the DSM system.

FIG. 6 shows an example table in a channel quality database 250 that may track the MCS values for the channels in the system. As shown, the average MCS value per channel per associated DSM client may be maintained in the database. Based on the MCS values, a total power constraint and/or a per channel power constraint, the CMF may pre-compute Tx power distributions across channels for a DSM client. The Tx power allocation vector for the DSM client may be signaled to the associated AP. The AP may dynamically adjust the Tx power distribution based on the DSM client it is communicating with.

Figures 7, 8:
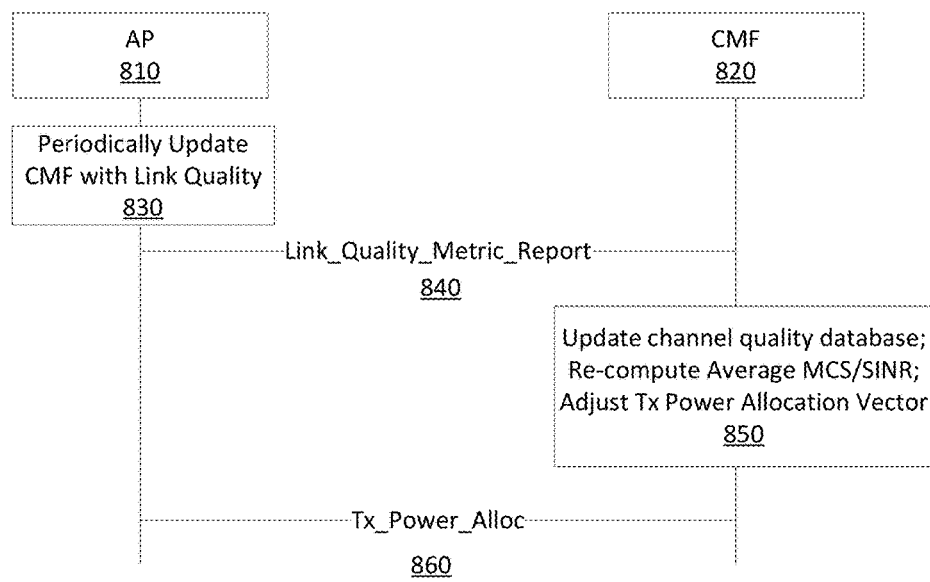
FIG. 7 shows an example table in a channel quality database that may track the MCS values for the channels in the system.
FIG. 8 shows example signaling between a channel management function (CMF) and an access point (AP).

FIG. 7 shows an example table in a channel quality database 250 that may track the MCS values for the channels in the system. As shown, the MCS and/or SINR information per DSM client per QoS class may be tracked for one or more DSM clients such as STA 'k'. Based on the channel quality information, a total power constraint and/or a per channel power constraint, the CMF may pre-compute Tx power distributions across the channels for a QoS associated with the DSM client. For example, Tx power distributions across the channels for each QoS per DSM client may be computed. The Tx power allocation vector for the QoSes of the DSM client may be signaled to the associated AP. The AP may dynamically adjust the Tx power distribution based on the DSM client it is communicating with.

FIG. 8 shows example signaling between a CMF and an AP. For example, CMF 820 may exchange signaling with one or more MAC components/entities at AP 810. CMF 820 may send or receive signaling to or from other layers or entities at the AP 810. At 830, the AP 810 may update the CMF 820 with link quality information. The update may be provided periodically. For example, the AP 810 may send a link quality metric report 850 to the CMF 820. The CMF 820 may receive the link quality metric report 840. The link quality metric report 840 may include channel quality information for one or more channels associated with one or more DSM clients. At 850, The CMF 820 may update the channel quality database 250 based on the received link quality information in the link quality metric report 840. The CMF 820 may compute or re-compute the average MCS and/or SINR values and may adjust the Tx power allocation accordingly. The CMF 820 may send the adjusted or updated Tx power allocation vector to the associated AP 810. For example, the Tx Power allocation message 860 may be sent to the AP 810.

Figures 9, 10:
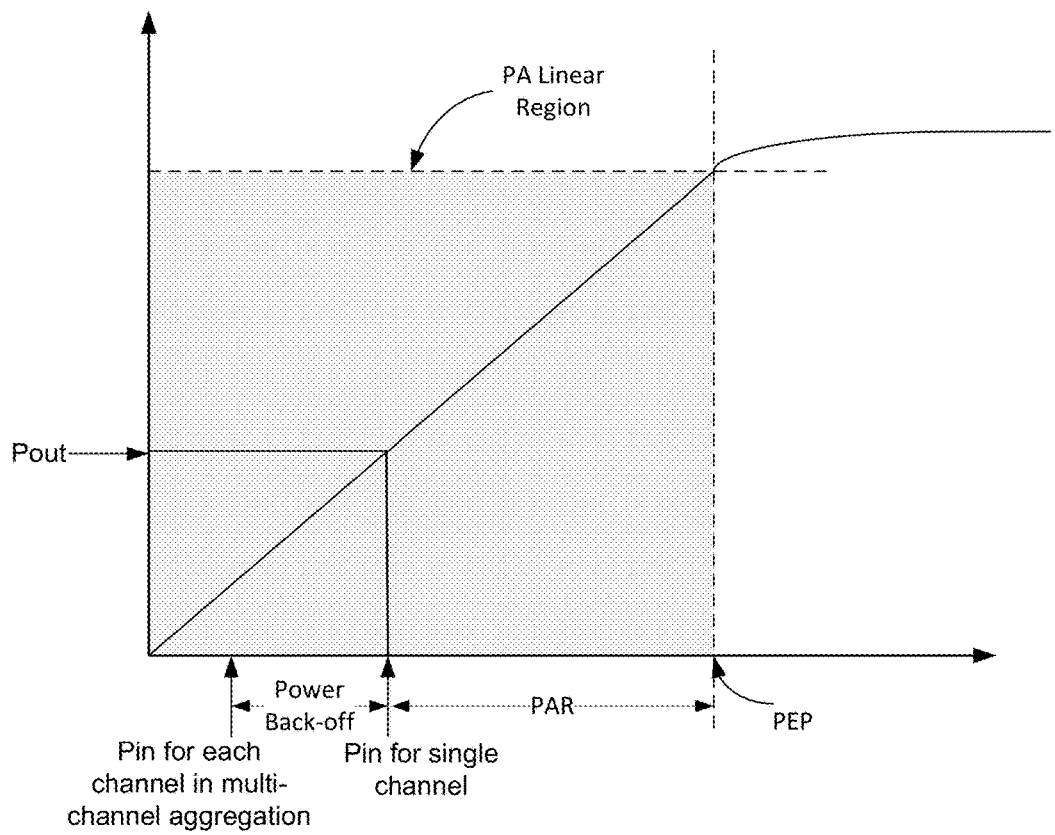
FIG. 9 shows example messages over a MAC-CMF interface.
FIG. 10 shows power amplifier (PA) linearity considerations.

FIG. 9 illustrates example definitions of the signaling between the CMF and the AP shown in FIG. 8. As shown, a transmit power allocation message may be sent from the CMF to the MAC at the AP. The transmit power allocation message may include an identifier of a DSM client, such as the STA address associated with the DSM client. The transmit power allocation message may include an identifier of a QoS such as a QoS ID. The transmit power allocation message may include information indicative of the transmit power allocation across channels for the QoS associated with the DSM client.

As shown in FIG. 9, a link quality metric report message may be sent from the MAC at the AP to the CMF. The link quality metric report message may include an identifier of a DSM client, such as the STA address associated with the DSM client. The link quality metric report message may include an identifier of a QoS, such as a QoS ID. The link quality metric report message may include an identifier of a MCS such as a MCS index. The link quality metric report message may include the link quality information associated with the DSM client with the QoS using the MCS. For example, the link quality information may include a value indicative of the SINR of the link.

Tx power allocations may take into account the power amplifier (PA) capability. This may alleviate saturations in the PA which causes inter-modulation distortions. FIG. 10 shows power amplifier (PA) linearity considerations. For example, an AP may operate as a fixed mode device with a total Tx power of 1 Watt (=30 dBm) at the antenna port may have a PA peak envelop power (PEP) that is limited to 42 dBm. This may be the power at the output of the PA. If the PA has a 30 dB gain in the linear operating region, the input power at the PA may equal to 0 dBm. If the waveform on a single channel has a peak-to-average ratio (PAR) of 12 dB, the peak power of the waveform may be as much as 12 dBm at the input of the PA to avoid saturation. In the case of a multi-channel aggregation system, the per-channel power may be backed-off by ΔP1 so that the total power of all the channels at the input to the PA is still equal to 0 dBm, and ΔP2 so that the PEP of the aggregated signal at the input to PA is still 12 dBm. In the case of a multi-channel aggregation system, the input power per channel $\tilde{P}_{in}$ may be equal to $\tilde{P}_{in} = P_{in} - \Delta P_1 - \Delta P_2 \ldots - \Delta P_n$. Thus the CMF may be aware of the PA capability at the transmitter.

One or more channels may be selected for carrier aggregation based on one or more channel quality thresholds. For example, the CMF may perform channel selection. For example, the CMF may use the primary channel SINR as a reference SINR. The primary channel may be the best available channel observed in the spectrum of interest. For example, the CMF may exclude channels with SINR considered out-of-range or unusable. The CMF may consider a channel with SINR below a threshold value out-of-range or unusable. The threshold value may include a programmable value such as 6 dB for Wi-Fi systems, and can be set to a different value for other RATs. The CMF may keep the active channels' SINRs within a predefined SINR range respective to the reference SINR. This may reduce the packet reordering delay. The CMF may exclude channels with SINR below a predefined SINR threshold such that the primary or other non-primary channels benefit from increased TX power. This may increase the coverage with higher reliability.

The channel(s) may be selected based on one or more parameters. The parameters may be static, semi-static, or dynamically configurable. The parameters may include, the SINR of the primary channel, the MCS of the primary channel, a delta SINR, a delta MCS, a range extension threshold, a low channel quality threshold and/or other parameters associated with the requirements described herein. The SINR (or MCS) of the primary channel may be used as a reference SINR or the best SINR. The primary channel may be selected based on channel quality. The delta SINR may indicate the SINR value difference between the primary channel and other non-primary active channels. The delta MCS may indicate the MCS value difference between the primary channel and other non-primary active channels. The active channels may be selected such that their channel quality is within delta SINR (or MCS) of the primary channel SINR (or MCS). The range extension threshold parameter may indicate the SINR or MCS value below which the non-primary channels may not be added to the aggregation. The active channels may benefit from the increase in transmit power. The low channel quality threshold parameter may indicate the SINR (or MCS) value below which channels may be excluded from the candidate channel list or may be considered as an unsuitable channel.

Figure 11:
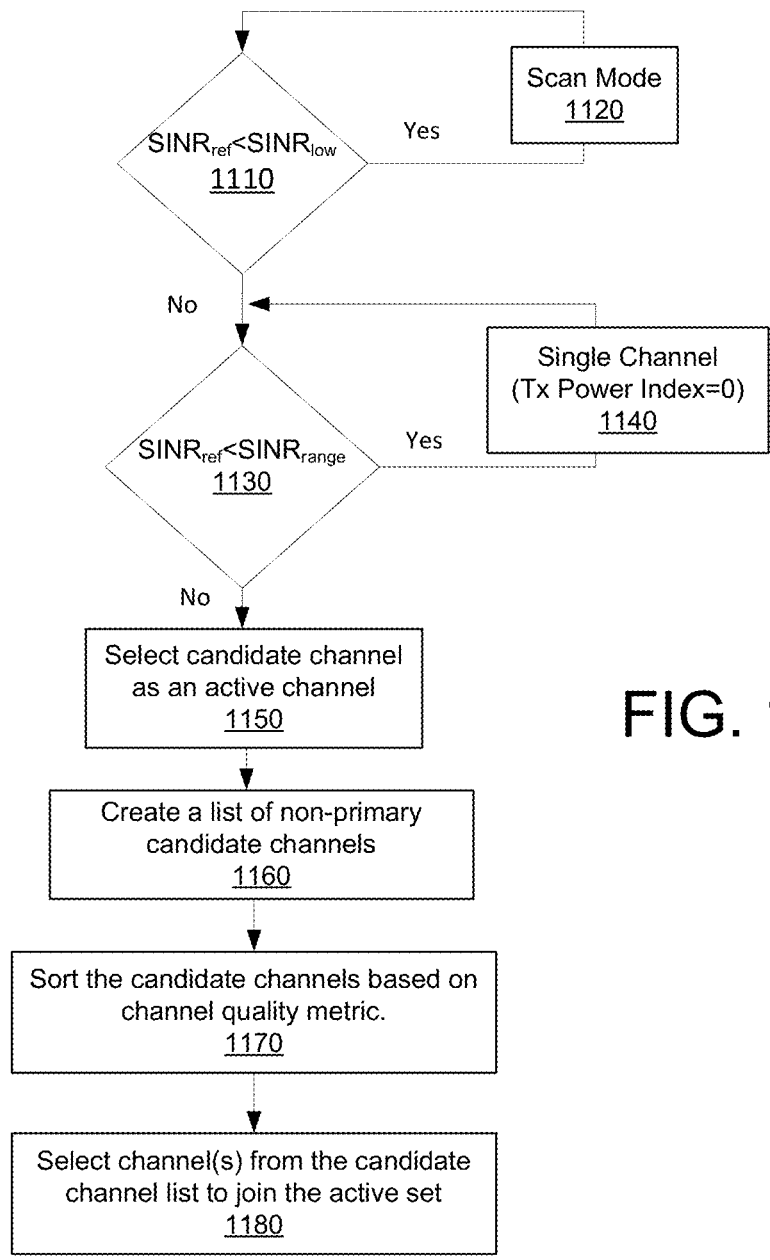
FIG. 11 shows an example flow diagram of CMF channel selection process.

The DSM MAC may include a TX power configuration setting that may specify the channel power to apply based on the number of aggregated channels. FIG. 11 shows an example flow diagram of CMF channel selection process. At 1110, the SINR value of an available channel may be compared to the low channel quality threshold. If the SINR value of the channel is lower than the low channel quality threshold, at 1120 the CMF may enter a scan mode to search for another available channel. If the SINR value of the channel is higher than the low channel quality threshold, at 1130, the SINR value of the channel may be compared to a range extension threshold. If the SINR value of the channel is lower than the range extension threshold, at 1140, it may be determined that the system should operate with a single channel, and the transmit power index may be 0. If the SINR value of the channel is higher than or equal to the range extension threshold, at 1150, the channel may be selected as an active channel. At 1160, a list of candidate channels may be created. At 1170, the candidate channels on the candidate channel list may be sorted based on the channel quality metric.

At 1180, channel(s) may be selected from the candidate channel list to join the active set. Example logic for selecting channels to join the active set may include, but not limited to, the following.

```
FOR EACH non-primary candidate channel
    IF ((candidate channel SINR >= SINR_low)
        AND (SINR_ref − candidate channel SINR < Delta SINR))
    THEN
        IF (candidate channel SINR >= SINR_range)
            THEN
                Select candidate channel as Active
        ELSE
            Non-Primary channels
                /* range extension case */
```

```
        IF (number of Active channels < maximum
            number of aggregated channels)
        THEN
            Select candidate channel as Active
            Stop adding non-primary channels
    ELSE
            Stop adding non-primary channels
END FOR
``` where, $SINR_{ref}$ may represent the primary channel SINR; $SINR_{range}$ may represent the SINR range extension threshold, with default value being 6 dB; $SINR_{low}$ may represent the SINR corresponding to a low channel quality threshold (or unusable channel), with default value being 3 dB for SINR and 2 for MCS; delta SINR threshold may represent the SINR difference threshold between the primary channel SINR and other non-primary active channels, with default value being 12 dB for SINR and 6 for MCS; TX power with index 0 may represent operating with one channel, index 1 may represent operating with 2 channels, index 2 may represent operating with 3 channels . . . index n may represent operating with n+1 channels. SINR may be replaced with MCS. The candidate channel list may include the channels ranked based on the channel quality with best channel, starting with the first channel in candidate channel list.

As shown in the example logic, the determination of whether a candidate channel may be selected to join the active set for a DSM client may be based on the channel quality of the candidate channel as compared to one or more thresholds. The candidate channel may be excluded from the active set on a condition that the channel quality is less than a low channel quality threshold such as a SINR low channel quality threshold and/or a MCS low channel quality threshold. The candidate channel may be excluded from the active set on a condition that the difference between the channel quality of the candidate channel and the channel quality of the primary channel exceeds a delta threshold, such as a delta SINR threshold and/or a delta MCS threshold. The candidate channel may be excluded from the active set on a condition that the channel quality is less than a range extension threshold, such as a SINR range extension threshold and/or a MCS range extension threshold. The threshold values may be pre-configured, semi-static, or dynamically configurable.

Based on a determination that the channel quality of the candidate channel reaches or exceeds the low channel quality threshold, that the difference between the channel quality of the candidate channel and the channel quality of the primary channel is less than the delta threshold, and the channel quality of the candidate channel reaches or exceeds a range extension threshold, the candidate channel may be selected as an active channel in the active set.

Figure 12:
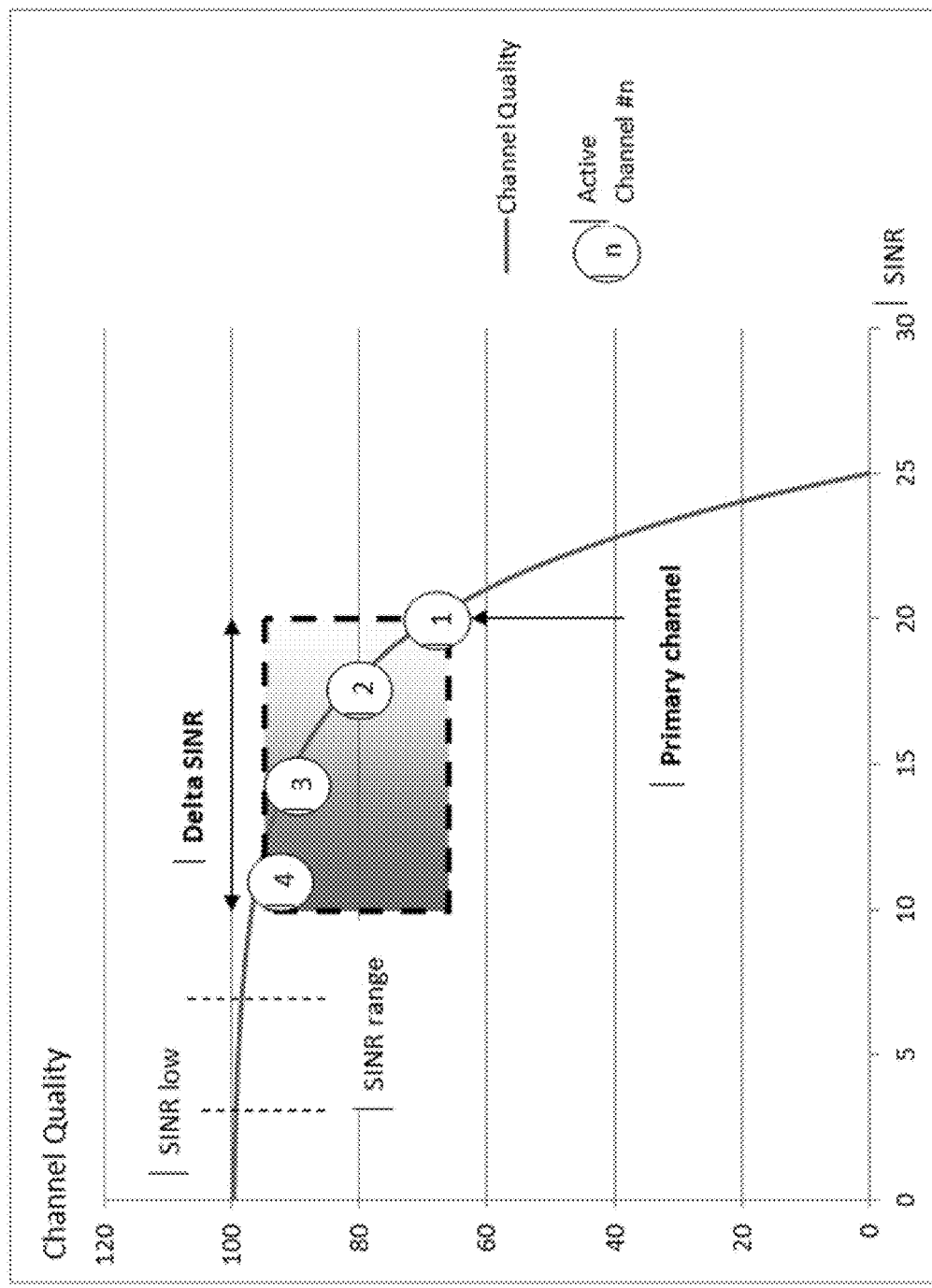
FIG. 12 shows how channel selection may be affected by the channel quality parameters.

FIG. 12 shows how channel selection may be affected by the channel quality parameters. FIG. 12 shows four active channels within Delta SINR from a primary channel, and how the CMF channel selection parameters relate to the channel quality metric. The SINR-related parameters may be replaced with MCS-related parameters.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Any of the herein described PHY RSSI measurement and/or estimation techniques may be implemented when there are few UL data packets and/or acknowledgment packets (e.g., no UL data packets and/or acknowledgment packets) transmitted on one or more non-primary channels (e.g., one or more non-primary channels aggregated with a primary channel). Features and/or elements described herein in accordance with one or more example embodiments may be used in combination with features and/or elements described herein in accordance with one or more other example embodiments. For example, PHY RSSI values for respective non-primary channels of a select channel aggregation may be measured in accordance with induced data packets, retrieved from a lookup table, and/or approximated, in any combination.

What is claimed:

1. A method of performing a channel quality measurement in a dynamic spectrum management (DSM) system, the method comprising:
   communicating on a non-primary channel as a secondary user over a dynamic spectrum, wherein the non-primary channel is part of a set of aggregated active channels comprising a primary channel and at least one non-primary channel;
   performing a first uplink channel quality measurement on the non-primary channel;
   starting a timer upon the first uplink channel quality measurement, wherein the timer is reset upon an uplink activity associated with the non-primary channel occurring;
   upon expiration of the timer, determining that a channel quality measurement on the non-primary channel is to be triggered;
   based on the determining, triggering a data sending event in an uplink on the non-primary channel for measuring uplink channel quality on the non-primary channel;
   performing a second uplink channel quality measurement on the non-primary channel based on the triggered data sending event in the uplink;
   storing channel quality information associated with a reference active channel in the set of aggregated active channels; and
   determining a channel quality associated with a candidate channel based on the channel quality information associated with the reference active channel and a calibration offset associated with the candidate channel, wherein the candidate channel is a channel of the DSM system that is not part of the set of aggregated active channels.

2. The method of claim 1, wherein triggering the data sending event in the uplink on the non-primary channel comprises at least one of:
   sending Transmission Control Protocol (TCP) downlink data to a DSM client on the non-primary channel; or requesting a data frame to be sent on the non-primary channel.

3. The method of claim 1, further comprising in response to the data sending event, performing at least one of:
receiving a NULL frame on the non-primary channel; or
receiving a control frame on the non-primary channel.

4. The method of claim 1, wherein performing the uplink channel quality measurement on the non-primary channel based on the data sending event further comprises:
receiving a data frame via the non-primary channel, wherein the data frame is sent in response to the data sending event; and
determining the channel quality for the non-primary channel based on the received data frame.

5. A dynamic spectrum management (DSM) client for supporting a channel quality measurement, the DSM client comprising:
a processor; and
a memory containing instructions that when executed by the processor cause the DSM client to:
communicate on a non-primary channel a secondary user over a dynamic spectrum, wherein the non-primary channel is part of a set of aggregated active channels comprising a primary channel and at least one non-primary channel;
start a timer upon a first uplink channel quality measurement, wherein the timer is reset upon an uplink activity associated with the non-primary channel occurring;
upon expiration of the timer, determine that a channel quality measurement on the non-primary channel is to be triggered;
based on the determination, trigger a data sending event in an uplink on the non-primary channel that allows a second uplink channel quality measurement pertaining to the non-primary channel to be performed;
send a data frame on the non-primary channel in the uplink in response to the triggering;
store channel quality information associated with a reference active channel in the set of aggregated active channels; and
determine a channel quality associated with a candidate channel based on the channel quality information associated with the reference active channel and a calibration offset associated with the candidate channel, wherein the candidate channel is a channel of the DSM client that is not part of the set of aggregated active channels.

6. The DSM client of claim 5, wherein the timer is reset upon the DSM client sending a data frame on the non-primary channel.

7. The DSM client of claim 5, wherein the data frame comprises at least one of a NULL data frame, or a control data frame.

8. The method of claim 1, wherein triggering the data sending event in the uplink on the non-primary channel comprises sending a channel quality measurement request message to a DSM client on the non-primary channel.

9. A dynamic spectrum management (DSM) engine for performing channel quality measurements in a DSM system, the DSM engine comprises:
a processor; and
a memory containing instructions that when executed by the processor cause the DSM engine to:
communicate on a non-primary channel a secondary user over a dynamic spectrum, wherein the non-primary channel is part of a set of aggregated active channels comprising a primary channel and at least one non-primary channel;
perform a first uplink channel quality measurement on the non-primary channel;
start a timer upon the first uplink channel quality measurement, wherein the timer is reset upon an uplink activity associated with the non-primary channel occurring;
upon expiration of the timer, determine that a channel quality measurement on the non-primary channel is to be triggered;
based on the determining, trigger a data sending event in an uplink on the non-primary channel for measuring uplink channel quality on the non-primary channel;
perform a second uplink channel quality measurement on the non-primary channel based on the triggered data sending event in the uplink;
store channel quality information associated with a reference active channel in the set of aggregated active channels; and
determine a channel quality associated with a candidate channel based on the channel quality information associated with the reference active channel and a calibration offset associated with the candidate channel, wherein the candidate channel is a channel of the DSM system that is not part of the set of aggregated active channels.

10. The DSM engine of claim 9, wherein triggering the data sending event in the uplink on the non-primary channel comprises at least one of:
sending Transmission Control Protocol (TCP) downlink data to a DSM client on the non-primary channel; or
requesting a data frame to be sent on the non-primary channel.

11. The DSM engine of claim 9, wherein the memory contains instructions that when executed by the processor cause the DSM engine to:
receive a data frame via the non-primary channel in response to the data sending event; and
determine the channel quality for the non-primary channel based on the received data frame.

12. The DSM engine of claim 9, wherein performing the second uplink channel quality measurement on the non-primary channel comprises determining physical layer received signal strength indicator (PHY RSSI) of the non-primary channel in the uplink.

13. The DSM engine of claim 9, wherein the non-primary channel is associated with a DSM client, and the memory contains instructions that when executed by the processor cause the DSM engine to:
compute transmit power distribution across the set of aggregated active channels associated with the DSM client based on the second uplink channel quality measurement and a total transmit power constraint for the set of aggregated active channels;
allocate transmit power for the set of aggregated active channels for the DSM client based on the computing; and
send a transmit power allocation message comprising information indicative of the transmit power distribution across the set of aggregated active channels for the DSM client.

14. The method of claim 1, wherein performing the second uplink channel quality measurement on the non-primary channel comprises determining physical layer received signal strength indicator (PHY RSSI) of the non-primary channel in the uplink.

15. The method of claim 1, wherein the non-primary channel is associated with a DSM client, and the method further comprises:
- computing transmit power distribution across the set of aggregated active channels associated with the DSM client based on the second uplink channel quality measurement and a total transmit power constraint for the set of aggregated active channels;
- allocating transmit power for the set of aggregated active channels for the DSM client based on the computing; and
- sending a transmit power allocation message comprising information indicative of the transmit power distribution across the set of aggregated active channels for the DSM client.

* * * * *